United States Patent
Aranami et al.

(10) Patent No.: US 11,742,525 B2
(45) Date of Patent: Aug. 29, 2023

(54) DIVIDED ENERGY ELECTROCHEMICAL CELL SYSTEMS AND METHODS OF PRODUCING THE SAME

(71) Applicants: 24M Technologies, Inc., Cambridge, MA (US); Kyocera Corporation, Kyoto (JP)

(72) Inventors: Junji Aranami, Otsu (JP); Junzheng Chen, Concord, MA (US); Naoki Ota, Lexington, MA (US)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 94 days.

(21) Appl. No.: 17/169,862

(22) Filed: Feb. 8, 2021

(65) Prior Publication Data

US 2021/0249695 A1 Aug. 12, 2021

Related U.S. Application Data

(60) Provisional application No. 62/971,679, filed on Feb. 7, 2020.

(51) Int. Cl.
*H01M 8/18* (2006.01)
*H01M 10/0585* (2010.01)
(Continued)

(52) U.S. Cl.
CPC ....... *H01M 10/0585* (2013.01); *H01M 4/133* (2013.01); *H01M 4/136* (2013.01);
(Continued)

(58) Field of Classification Search
None
See application file for complete search history.

(56) References Cited

U.S. PATENT DOCUMENTS 2,208,028 A 7/1940 Harrington
3,624,628 A 11/1971 Schmidt
(Continued)

FOREIGN PATENT DOCUMENTS

CN 1333929 A 1/2002
CN 101171703 A 4/2008
(Continued)

OTHER PUBLICATIONS

Decision to Grant for Japanese Application No. 2020-184414, dated May 23, 2022, 3 Pages.
(Continued)

*Primary Examiner* — Yoshitoshi Takeuchi
(74) *Attorney, Agent, or Firm* — Cooley LLP

(57) ABSTRACT

Embodiments described herein relate to divided energy electrochemical cells and electrochemical cell systems. Divided energy electrochemical cells and electrochemical cell systems include a first electrochemical cell and a second electrochemical cell connected in parallel. Both electrochemical cells include a cathode disposed on a cathode current collector, an anode disposed on an anode current collector, and a separator disposed between the anode and the cathode. In some embodiments, the first electrochemical cell can have different performance properties from the second electrochemical cell. For example, the first electrochemical cell can have a high energy density while the second electrochemical cell can have a high power density. In some embodiments, the first electrochemical cell can have a battery chemistry, thickness, or any other physical/chemical property different from those properties of the second electrochemical cell.

16 Claims, 18 Drawing Sheets

(51) Int. Cl.
    *H01M 4/133* (2010.01)
    *H01M 10/0525* (2010.01)
    *H01M 4/587* (2010.01)
    *H01M 4/58* (2010.01)
    *H01M 4/136* (2010.01)

(52) U.S. Cl.
    CPC ......... *H01M 4/587* (2013.01); *H01M 4/5825* (2013.01); *H01M 10/0525* (2013.01)

(56) References Cited

U.S. PATENT DOCUMENTS

| | | |
|---|---|---|
| 3,982,966 A | 9/1976 | Beatty et al. |
| 4,080,728 A | 3/1978 | Buckler |
| 4,105,815 A | 8/1978 | Buckler |
| 4,199,912 A | 4/1980 | James, Jr. et al. |
| 4,386,019 A | 5/1983 | Kann et al. |
| 4,623,598 A | 11/1986 | Waki et al. |
| 4,695,355 A | 9/1987 | Koziol |
| 4,818,643 A | 4/1989 | Cook et al. |
| 4,925,752 A | 5/1990 | Fauteux et al. |
| 5,316,556 A | 5/1994 | Morris |
| 5,582,931 A | 12/1996 | Kawakami |
| 5,603,770 A | 2/1997 | Sato |
| 5,612,152 A | 3/1997 | Bates |
| 5,674,556 A | 10/1997 | Fukumura et al. |
| 5,697,145 A | 12/1997 | Fukumura et al. |
| 5,725,822 A | 3/1998 | Keller et al. |
| 5,749,927 A | 5/1998 | Chern et al. |
| 5,792,576 A | 8/1998 | Xing et al. |
| 5,814,420 A | 9/1998 | Chu |
| 5,834,052 A | 11/1998 | Fukumura et al. |
| 5,837,397 A | 11/1998 | Xing |
| 6,207,322 B1 | 3/2001 | Kelsey et al. |
| 6,264,707 B1 | 7/2001 | Ishikawa et al. |
| 6,284,192 B1 | 9/2001 | Coonan et al. |
| 6,287,722 B1 | 9/2001 | Barton et al. |
| 6,291,091 B1 | 9/2001 | Preischl et al. |
| 6,296,967 B1 | 10/2001 | Jacobs et al. |
| 6,296,971 B1 | 10/2001 | Hara |
| 6,306,215 B1 | 10/2001 | Larkin |
| 6,368,365 B1 | 4/2002 | Chi et al. |
| 6,403,262 B1 | 6/2002 | Xing et al. |
| 6,461,757 B1 | 10/2002 | Sasayama et al. |
| 6,503,432 B1 | 1/2003 | Barton et al. |
| 6,503,657 B1 | 1/2003 | Takami et al. |
| 6,576,365 B1 | 6/2003 | Meitav et al. |
| 6,589,299 B2 | 7/2003 | Missling et al. |
| 6,803,145 B1 | 10/2004 | von During |
| 6,939,383 B2 | 9/2005 | Eastin et al. |
| 6,986,967 B2 | 1/2006 | Barton et al. |
| 7,022,391 B2 | 4/2006 | Kawai et al. |
| 7,041,380 B2 | 5/2006 | Yamashita et al. |
| 7,338,734 B2 | 3/2008 | Chiang et al. |
| 7,524,577 B2 | 4/2009 | Bates |
| 7,700,019 B2 | 4/2010 | Lavoie et al. |
| 7,846,575 B2 | 12/2010 | Heller, Jr. et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,108,107 B2 | 8/2021 | Kim et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 2001/0012588 A1 | 8/2001 | Kaido et al. |
| 2001/0021471 A1 | 9/2001 | Xing et al. |
| 2003/0071337 A1 | 4/2003 | Mitani et al. |
| 2003/0116556 A1 | 6/2003 | Li |
| 2003/0116881 A1 | 6/2003 | Nelson et al. |
| 2003/0205835 A1 | 11/2003 | Eastin et al. |
| 2004/0029001 A1 | 2/2004 | Yamazaki et al. |
| 2004/0029008 A1 | 2/2004 | Winterberg et al. |
| 2004/0029311 A1 | 2/2004 | Snyder et al. |
| 2004/0131934 A1 | 7/2004 | Sugnaux et al. |
| 2004/0264110 A1 | 12/2004 | Michel et al. |
| 2005/0037262 A1 | 2/2005 | Vallee et al. |
| 2005/0064270 A1 | 3/2005 | Marionowski |
| 2005/0214648 A1 | 9/2005 | Boulton et al. |
| 2006/0046137 A1 | 3/2006 | Kodama |
| 2006/0057433 A1 | 3/2006 | Ando et al. |
| 2007/0034251 A1 | 2/2007 | Jonczyk et al. |
| 2008/0289676 A1 | 11/2008 | Guidotti et al. |
| 2009/0023041 A1 | 1/2009 | Cooper |
| 2009/0029259 A1 | 1/2009 | Okazaki et al. |
| 2009/0186270 A1 | 7/2009 | Harada et al. |
| 2010/0040942 A1 | 2/2010 | Hatta et al. |
| 2010/0047671 A1 | 2/2010 | Chiang et al. |
| 2010/0112454 A1 | 5/2010 | Visco et al. |
| 2010/0190081 A1* | 7/2010 | Park ................ H01M 10/0418 429/452 |
| 2010/0196800 A1 | 8/2010 | Markoski et al. |
| 2010/0323264 A1 | 12/2010 | Chiang et al. |
| 2011/0086258 A1 | 4/2011 | Yaginuma et al. |
| 2011/0104527 A1 | 5/2011 | Choi et al. |
| 2011/0129722 A1 | 6/2011 | Yoneda |
| 2011/0183169 A1 | 7/2011 | Bhardwaj et al. |
| 2011/0189520 A1 | 8/2011 | Carter et al. |
| 2011/0200848 A1 | 8/2011 | Chiang et al. |

(56) References Cited

U.S. PATENT DOCUMENTS

| | | |
|---|---|---|
| 2011/0274948 A1 | 11/2011 | Duduta et al. |
| 2011/0287314 A1 | 11/2011 | Jung |
| 2011/0300440 A1 | 12/2011 | Matsuda et al. |
| 2011/0311857 A1 | 12/2011 | Tucholski |
| 2012/0003547 A1 | 1/2012 | Raj |
| 2012/0058378 A1 | 3/2012 | Lee et al. |
| 2012/0070715 A1 | 3/2012 | Obika |
| 2012/0121963 A1 | 5/2012 | Kwon et al. |
| 2012/0164499 A1 | 6/2012 | Chiang et al. |
| 2012/0315537 A1 | 12/2012 | Ravdel et al. |
| 2013/0000110 A1 | 1/2013 | Takeda et al. |
| 2013/0029205 A1 | 1/2013 | Adams |
| 2013/0029206 A1 | 1/2013 | Lev |
| 2013/0055559 A1 | 3/2013 | Slocum et al. |
| 2013/0065122 A1 | 3/2013 | Chiang et al. |
| 2013/0230641 A1 | 9/2013 | Suzuki |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0079992 A1 | 3/2014 | Tanaka |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0272547 A1 | 9/2014 | Ramasubramanian et al. |
| 2014/0315097 A1 | 10/2014 | Tan et al. |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum et al. |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0031791 A1 | 2/2016 | Clark et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1* | 1/2017 | Ota .................. H01M 50/10 |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0359527 A1 | 11/2021 | Taylor et al. |
| 2021/0376380 A1 | 12/2021 | Tan et al. |
| 2021/0384516 A1 | 12/2021 | Michael et al. |
| 2022/0021019 A1 | 1/2022 | Tan et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |

FOREIGN PATENT DOCUMENTS

| | | |
|---|---|---|
| CN | 102089921 A | 6/2011 |
| CN | 102983369 A | 3/2013 |
| CN | 104040764 A | 9/2014 |
| CN | 111384404 A | 7/2020 |
| DE | 102013202367 A1 | 8/2014 |
| EP | 0602976 A1 | 6/1994 |
| EP | 1422769 A1 | 5/2004 |
| JP | S62-008932 B2 | 2/1987 |
| JP | H02-94619 A | 4/1990 |
| JP | H06-187998 | 7/1994 |
| JP | H10-027602 A | 1/1998 |
| JP | 2000-260423 A | 9/2000 |
| JP | 2002-359006 | 12/2002 |
| JP | 2003-123832 | 4/2003 |
| JP | 2003-532277 A | 10/2003 |
| JP | 2003-317731 A | 11/2003 |
| JP | 2004158222 A | 6/2004 |
| JP | 2005-056729 A | 3/2005 |
| JP | 2005-071658 | 3/2005 |
| JP | 2006-172766 A | 6/2006 |
| JP | 2006-172773 A | 6/2006 |
| JP | 2006-269288 A | 10/2006 |
| JP | 2006324114 A | 11/2006 |
| JP | 2007-115678 A | 5/2007 |
| JP | 3993223 B2 | 10/2007 |
| JP | 2008034556 A | 2/2008 |
| JP | 2008198492 A | 8/2008 |
| JP | 2009-059709 A | 3/2009 |
| JP | 2009-176513 A | 8/2009 |

(56) References Cited

FOREIGN PATENT DOCUMENTS

| | | | |
|---|---|---|---|
| JP | 2010-073421 A | 4/2010 |
| JP | 2010-245000 A | 10/2010 |
| JP | 4873703 B2 | 2/2012 |
| JP | 2012-204182 A | 10/2012 |
| JP | 2013-145649 | 7/2013 |
| JP | 2015-520490 | 7/2015 |
| KR | 100870355 B1 | 11/2008 |
| KR | 20100016711 A | 2/2010 |
| KR | 20120023491 A | 3/2012 |
| KR | 20140005075 A | 1/2014 |
| KR | 20140039022 A | 3/2014 |
| KR | 20140085589 A | 7/2014 |
| WO | WO 85/00248 | 1/1985 |
| WO | WO 2001/041232 | 7/2001 |
| WO | WO-2006120959 A1 | 11/2006 |
| WO | WO-2010032362 A1 | 3/2010 |
| WO | WO 2010/150077 | 12/2010 |
| WO | WO 2011/052094 | 5/2011 |
| WO | WO 2011/095758 | 8/2011 |
| WO | WO 2011/099793 | 8/2011 |
| WO | WO 2012/024499 | 2/2012 |
| WO | WO 2012/077707 | 6/2012 |
| WO | WO 2012/088442 | 6/2012 |
| WO | WO 2013/124423 | 8/2013 |
| WO | WO 2013/173689 | 11/2013 |
| WO | WO-2014093876 A1 | 6/2014 |
| WO | WO 2014/150210 | 9/2014 |
| WO | WO 2016/073575 | 5/2016 |
| WO | WO-2016131141 A1 | 8/2016 |
| WO | WO-2021087465 A1 | 5/2021 |
| WO | WO-2022212404 A1 | 10/2022 |

OTHER PUBLICATIONS

Examination Report for Canadian Application No. 2,969,135, dated Mar. 30, 2022, 3 pages.
Extended European Search Report for European Application No. 21196368.1, dated Feb. 16, 2022, 8 pages.
Final Rejection Office Action for U.S. Appl. No. 17/109,686 dated Jul. 20, 2022, 14 pages.
First Office Action for Chinese Application No. 202110490592.X dated May 11, 2022, 21 pages.
International Preliminary Report on Patentability for International Application No. PCT/US2020061498, dated Jun. 2, 2022, 13 pages.
International Search Report and Written Opinion for International Application No. PCT/US2022/022382, dated Jul. 18, 2022, 14 pages.
Invitation to Pay Additional Fees for International Application No. PCT/US2020/061498, dated Feb. 18, 2021, 13 pages.
Office Action for Canadian Application No. 2,962,788, dated Mar. 31, 2022, 4 pages.
Office Action for Japanese Application No. 2021-054101, dated Dec. 27, 2021, 7 pages.
Office Action for U.S. Appl. No. 17/109,686, dated Feb. 9, 2022, 15 pages.
Office Action for Japanese Application No. 2021-092052, dated Mar. 28, 2022, 13 pages.
Office Action for U.S. Appl. No. 17/402,059, dated Aug. 5, 2022, 6 pages.
Office Action for U.S. Appl. No. 13/607,021, dated Apr. 20, 2015, 8 pages.
Office Action for U.S. Appl. No. 13/607,021, dated Jul. 10, 2015, 4 pages.
International Search Report and Written Opinion for International Application No. PCT/US2012/054219, dated Feb. 21, 2013, 13 pages.
Office Action for U.S. Appl. No. 14/926,760, dated Jun. 27, 2018, 10 pages.
Office Action for U.S. Appl. No. 14/926,760, dated Feb. 25, 2019, 9 pages.
Office Action for U.S. Appl. No. 16/736,460, dated Feb. 2, 2021, 13 pages.
Office Action for U.S. Appl. No. 13/832,836, dated Feb. 26, 2015, 9 pages.
Extended European Search Report for European Application No. 13791074.1, dated Mar. 31, 2016, 6 pages.
Office Action for European Application No. 13791074.1, dated Aug. 7, 2018, 5 pages.
Notice of Reasons for Rejection for Japanese Application No. 2015-512878, dated Apr. 19, 2017, 7 pages.
Notice of Reasons for Rejection for Japanese Application No. 2015-512878, dated Mar. 29, 2019, 13 pages.
Notice of Reasons for Rejection for Japanese Application No. 2015-512878, dated Oct. 1, 2019, 6 pages.
Office Action for U.S. Appl. No. 14/543,489, dated Jul. 6, 2015, 9 pages.
Office Action for U.S. Appl. No. 14/543,489, dated Feb. 12, 2016, 7 pages.
International Search Report and Written Opinion for International Application No. PCT/US2013/041537, dated Oct. 10, 2013.
Extended European Search Report for European Application No. 20153431.0, dated Aug. 7, 2020, 12 pages.
Notice of Reasons for Rejection for Japanese Application No. 2018-088757, dated Apr. 8, 2019, 9 pages.
Notice of Reasons for Rejection for Japanese Application No. 2018-088757, dated Oct. 2, 2019, 6 pages.
Notice of Reasons for Rejection for Japanese Application No. 2018-088757, dated Apr. 2, 2020, 6 pages.
Notice of Reasons for Rejection for Japanese Application No. 2018-088757, dated Oct. 27, 2020, 7 pages.
Notice of Reasons for Rejection for Japanese Application No. 2018-088757, dated Jan. 21, 2021, 4 pages.
Office Action for U.S. Appl. No. 15/188,374, dated Apr. 12, 2017, 9 pages.
Office Action for U.S. Appl. No. 15/724,701, dated Apr. 4, 2019, 8 pages.
Office Action for U.S. Appl. No. 16/705,949, dated Dec. 9, 2020, 7 pages.
Office Action for Canadian Application No. 2,895,142, dated Oct. 22, 2021, 6 pages.
First Office Action for Chinese Application No. 201580057914.4, dated Jul. 8, 2019, 17 pages.
Second Office Action for Chinese Application No. 201580057914.4, dated Dec. 12, 2019, 7 pages.
Third Office Action for Chinese Application No. 201580057914.4, dated Apr. 13, 2020, 21 pages.
Fourth Office Action for Chinese Application No. 201580057914.4, dated Jul. 29, 2020, 14 pages.
Office Action for European Application No. 15794037.0, dated Jun. 4, 2019, 9 pages.
Office Action for European Application No. 15794037.0, dated Jan. 3, 2020, 6 pages.
Office Action for European Application No. 15794037.0, dated Aug. 27, 2020, 7 pages.
First Examination Report for Indian Application No. 201717010973, dated Aug. 16, 2020, 6 pages.
Notice of Reasons for Rejection for Japanese Application No. 2017-517309, dated Aug. 26, 2019, 11 pages.
Notice of Reasons for Rejection for Japanese Application No. 2017-517309, dated May 18, 2020, 13 pages.
Decision of Rejection for Japanese Application No. 2017-517309, dated Feb. 2, 2021, 7 pages.
Substantive Examination Adverse Report (Section 30(1) / 30(2)) and Search Report for Malaysian Application No. PI2017000573, dated May 8, 2020, 4 pages.
Office Action for U.S. Appl. No. 14/932,153, dated Aug. 7, 2018, 6 pages.
Office Action for U.S. Appl. No. 14/932,153, dated Jan. 31, 2019, 7 pages.
Office Action for Vietnam Application No. 1-2017-01769, dated Jan. 29, 2021, 2 pages.

(56) References Cited

OTHER PUBLICATIONS

International Search Report and Written Opinion for International Application No. PCT/US2015/058992, dated Jan. 14, 2016, 10 pages.
Examination Report No. 1 for Australian Application No. 2016280285, dated Nov. 2, 2020, 6 pages.
Examination Report for Canadian Application No. 2.962,788 dated Oct. 6, 2021, 3 pages.
First Office Action for Chinese Application No. 201680004584.7, dated Feb. 3, 2019, 17 pages.
Second Office Action for Chinese Application No. 201680004584.7, dated Aug. 15, 2019, 27 pages.
Third Office Action for Chinese Application No. 201680004584.7, dated Jan. 3, 2020, 24 pages.
Rejection Decision for Chinese Application No. 201680004584.7, dated May 11, 2020, 17 pages.
Notification of Reexamination for Chinese Application No. 201680004584.7, dated Oct. 28, 2020, 21 pages.
Extended European Search Report for European Application No. 16812533.4, dated Nov. 19, 2018, 7 pages.
Office Action for European Application No. 16812533.4, dated Jul. 31, 2020, 4 pages.
Office Action for Indian Application No. 201717017343, dated Jul. 9, 2020, 6 pages.
Office Action for Japanese Application No. 2017-526929, dated Feb. 18, 2020, 19 pages.
Substantive Examination Adverse Report (Section 30(1) / 30(2)) and Search Report for Malaysian Application No. PI2017000885, dated Jun. 18, 2020, 4 pages.
Substantive Examination Report (Restriction) for Philippines Patent Application No. 1-2017-500970, dated Mar. 14, 2019, 3 pages.
Subsequent Substantive Examination Report for Philippines Patent Application No. 1-2017-500970, dated Sep. 24, 2019, 10 pages.
Subsequent Substantive Examination Report for Philippines Patent Application No. 1-2017-500970, dated Dec. 6, 2019, 4 pages.
Office Action for U.S. Appl. No. 15/185,625, dated Nov. 2, 2017, 11 pages.
Office Action for U.S. Appl. No. 15/185,625, dated May 18, 2018, 9 pages.
International Search Report and Written Opinion for International Application No. PCT/US2016/038098, dated Oct. 31, 2016, 14 pages.
Office Action for U.S. Appl. No. 16/201,283, dated Jun. 15, 2020, 13 pages.
Office Action for U.S. Appl. No. 16/201,283, dated Oct. 23, 2020, 13 pages.
Office Action for U.S. Appl. No. 16/736,460, dated Sep. 28, 2021, 16 pages.
Armand, M. et al., "Conjugated dicarboxylate anodes for Li-ion batteries," Nature Materials, 8:120-125 (2009).
Bervas, M. et al., "Investigation of the Lithiation and Delithiation Conversion Mechanisms in a Bismuth Fluoride Nanocomposites," Journal of the Electrochemical Society, 153(4):A799-A808 (2006).
Chan, C. K. et al., "High-performance lithium battery anodes using silicon nanowires," Nature Nanotechnology, 3:31-35 (2008).
Duduta, M. et al., "Semi-Solid Lithium Rechargeable Flow Battery," Advanced Energy Materials. 1(4):511-516 (2011).
Li, H. et al., "Li-Storage via Heterogeneous Reaction in Selected Binary Metal Fluorides and Oxides," Journal of Electrochemical Society, 151(11): A1878-A1885 (2004).
Nakahara, K. et al. "Rechargeable batteries with organic radical cathodes," Chemical Physics Letters, 359:351-354 (2002).
Nishide, H. et al., "Organic radical battery: nitroxide polymers as a cathode-active material," Electrochimica Acta, 50:827-831 (2004).
Plitz, I. et al., "Structure and Electrochemistry of Carbon-Metal Fluoride Nanocomposites Fabricated by a Solid State Redox Conversion Reaction", Journal of the Electrochemical Society, 152(2): A307-A315 (2005).
Canadian Office Action for Application No. CA20162969135 dated Dec. 1, 2022, 5 pages.
Final Office Action dated Sep. 28, 2021 for U.S. Appl. No. 16/736,460, filed Jan. 7, 2020, 16 pages.
International Search Report and Written Opinion for Application No. PCT/US2022/048085, dated Feb. 16, 2023, 16 pages.
Non-Final Office Action for U.S. Appl. No. 17/683,557 dated Mar. 28, 2023, 8 pages.
Notice of Allowance for U.S. Appl. No. 17/402,059 dated Jan. 19, 2023, 7 pages.
Notice of Allowance for U.S. Appl. No. 17/109,686, dated Nov. 23, 2022, 5 pages.
Office Action and Search Report for Chinese Application No. CN202110490592.X dated Feb. 23, 2023, 14 pages.
Office Action for Indian Application No. IN201717010973 dated Dec. 29, 2022, 2 pages.
Office Action for Indian Application No. IN201717010973 dated Feb. 3, 2023, 2 pages.
Office Action for Indian Application No. IN201717010973 dated Feb. 27, 2023, 2 pages.
Office Action for Japanese Application No. JP20210092052 dated Feb. 7, 2023, 9 pages.
Office Action for Korean Application No. KR20177018200 dated Feb. 21, 2023, 14 pages.
Supplemental Notice of Allowance for U.S. Appl. No. 17/402,059 dated Feb. 23, 2023, 2 pages.
Notice of Reasons for Rejection for Japanese Application No. 2021-054104, dated Sep. 13, 2022, 4 pages.
Notice of Allowance for U.S. Appl. No. 17/109,686, dated Nov. 16, 2022, 10 pages.
Office Action for Canadian Application No. 2,962,788, dated Nov. 1, 2022, 4 pages.
Office Action for Korean Application No. 10-2017-7015132, dated Oct. 12, 2022, 17 pages.
Reinhart et al., "Research and Demonstration Center for the Production of Large-Area Lithium-Ion Cells," Future Trends in Production Engineering, Jan. 1, 2012, pp. 3-12.

* cited by examiner

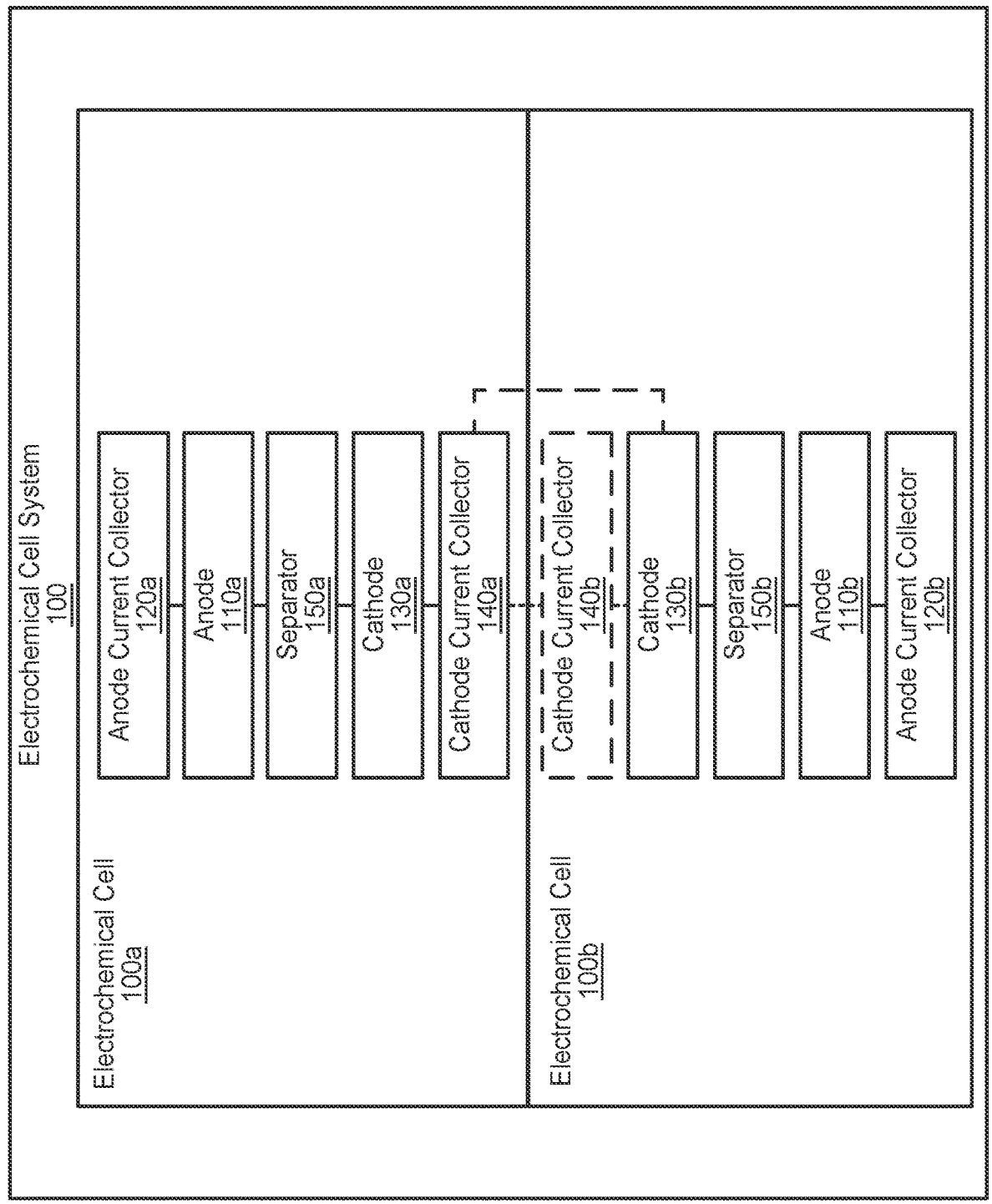

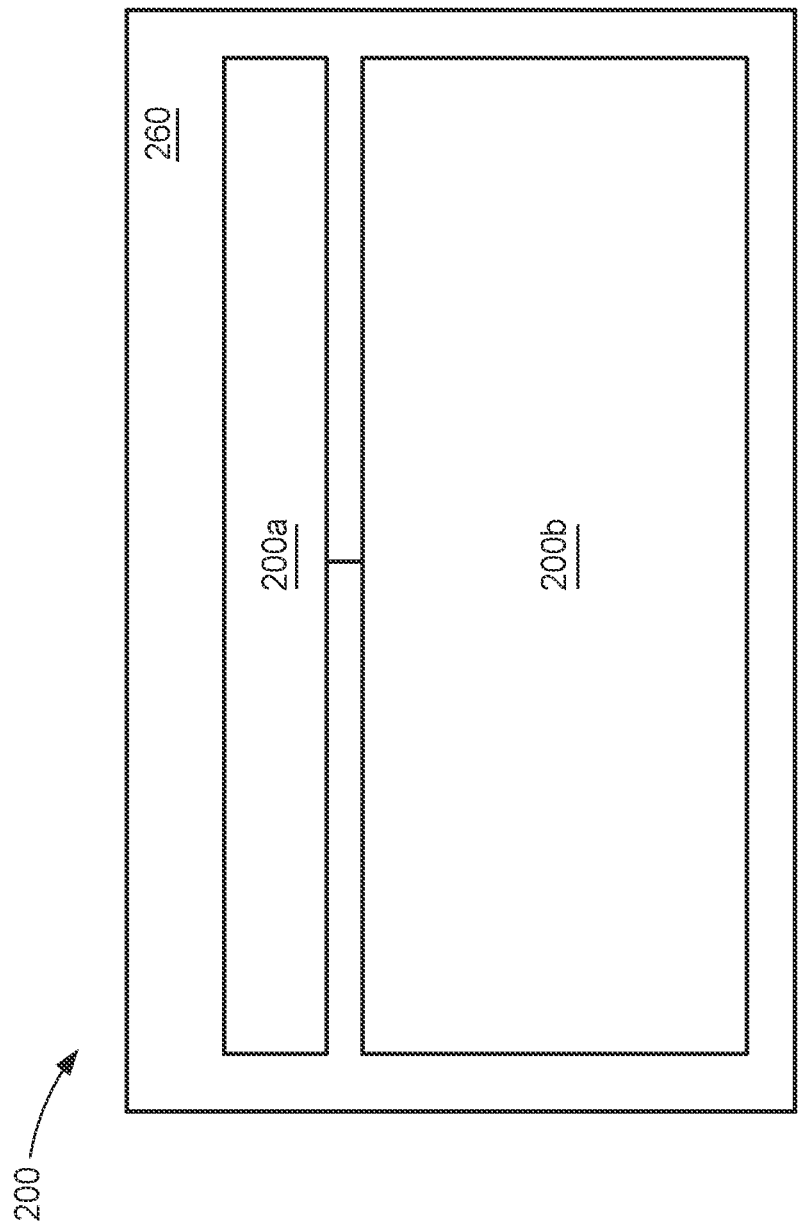

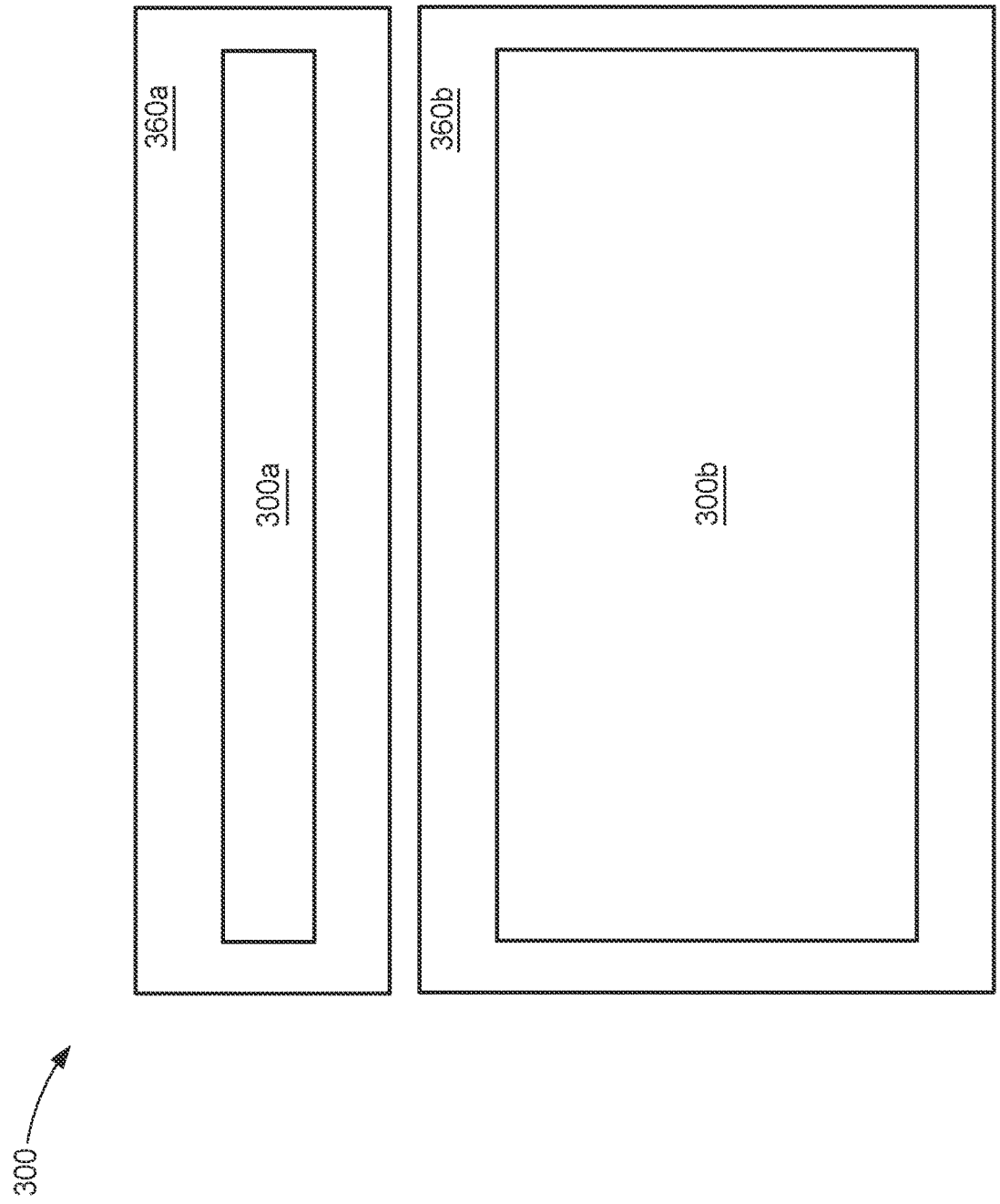

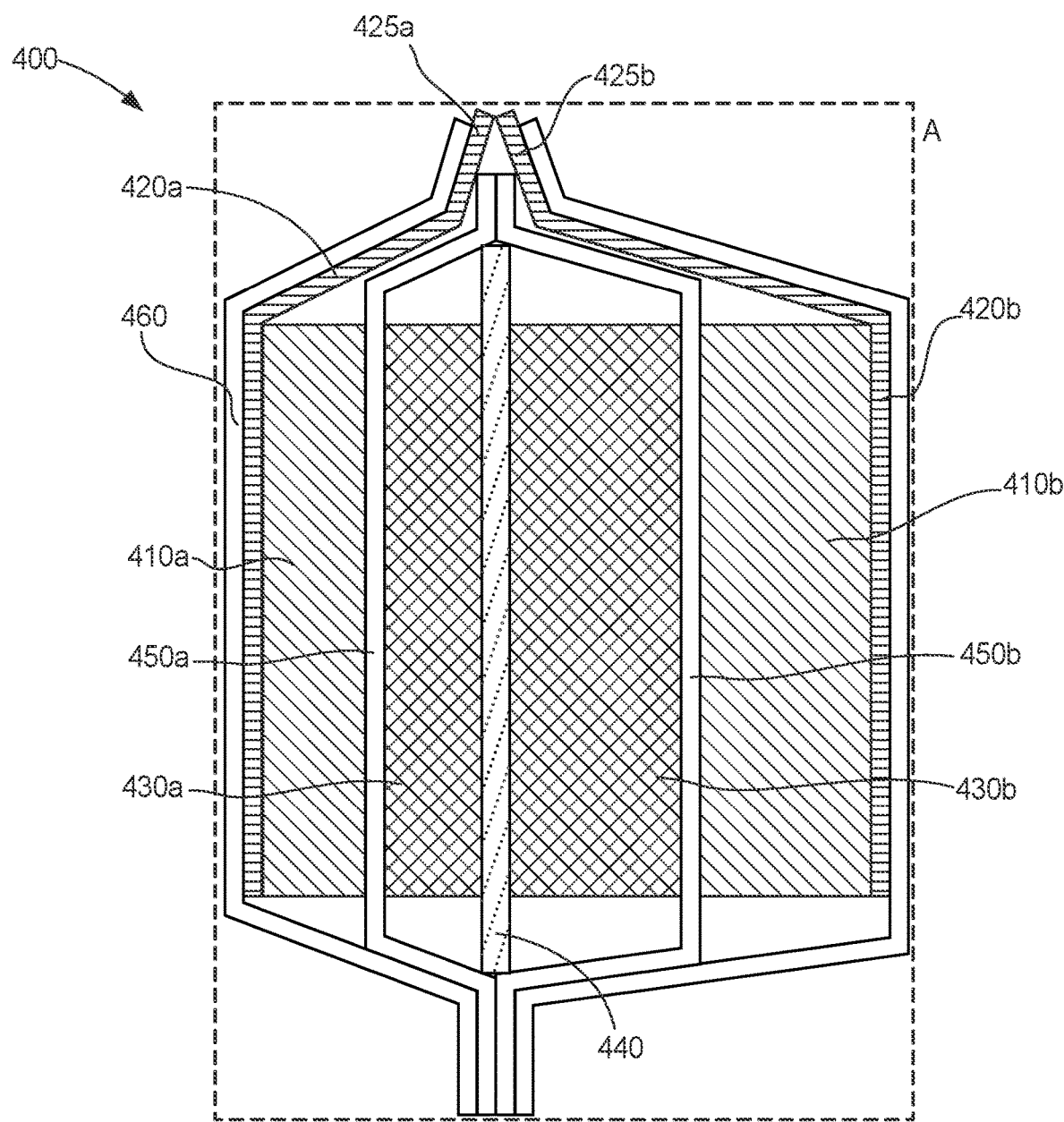

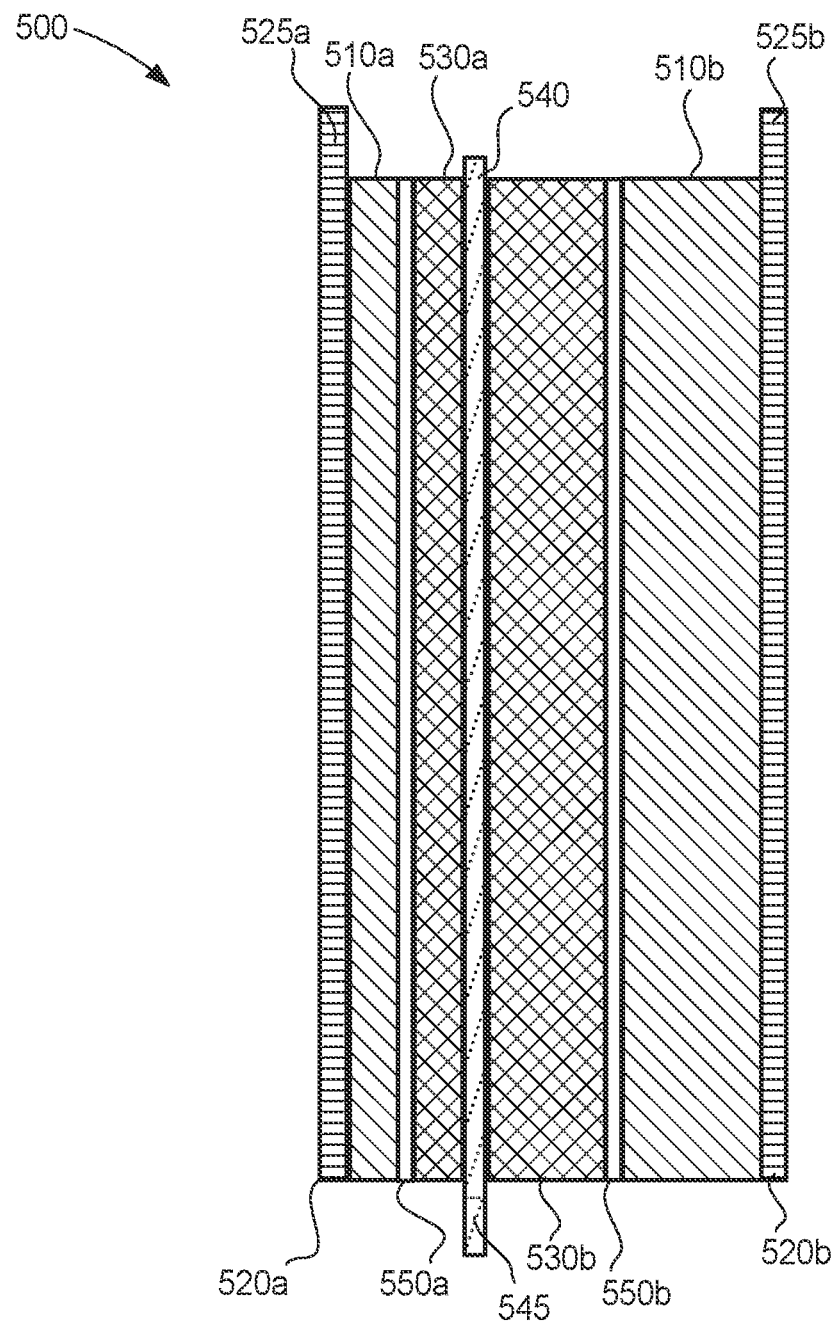

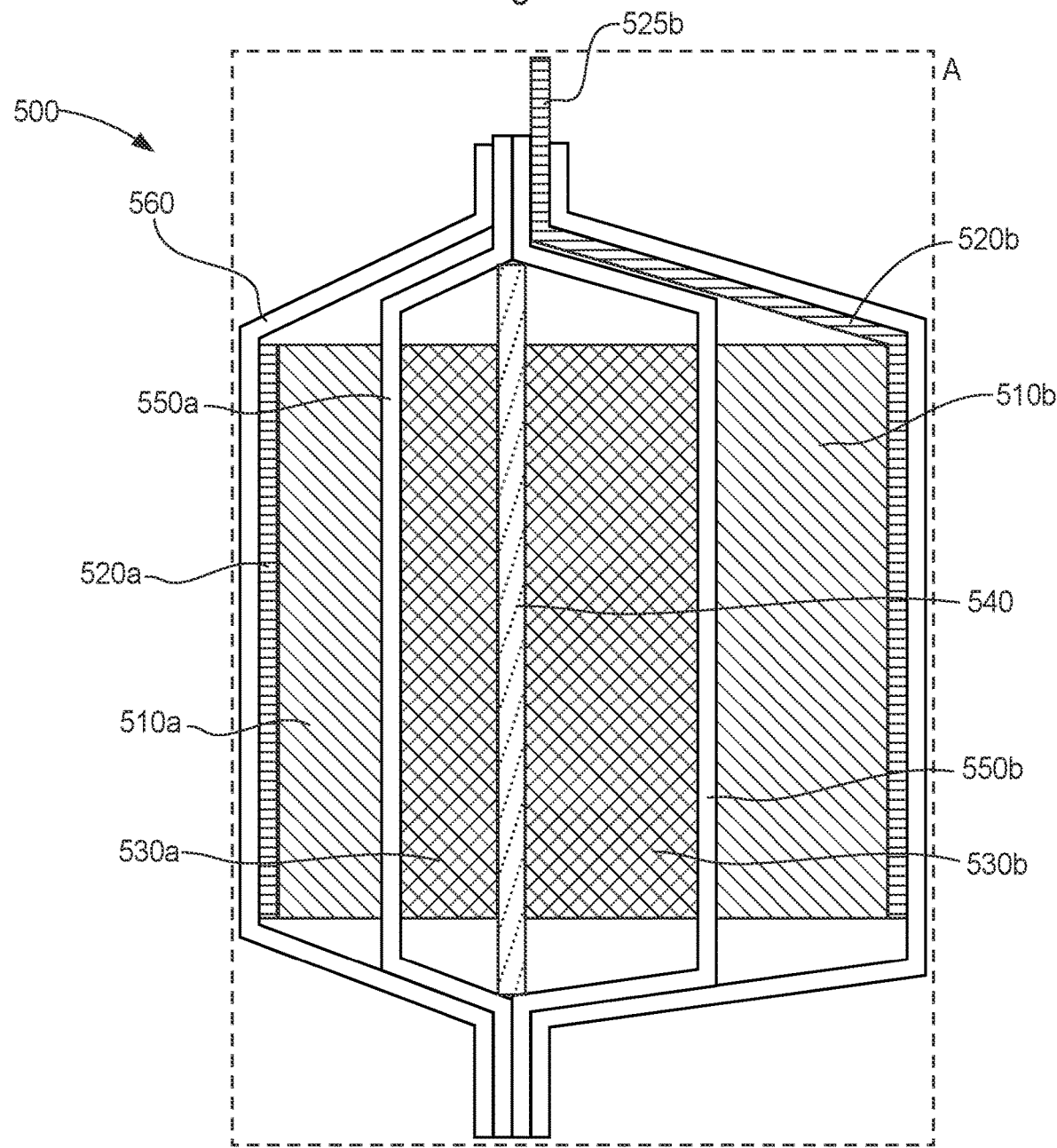

DIVIDED ENERGY ELECTROCHEMICAL CELL SYSTEMS AND METHODS OF PRODUCING THE SAME

CROSS-REFERENCE TO RELATED APPLICATIONS

This application claims the priority to and the benefit of U.S. Provisional Application No. 62/971,679, entitled "DIVIDED ENERGY ELECTROCHEMICAL CELL SYSTEMS AND METHODS OF PRODUCING THE SAME," and filed on Feb. 7, 2020, the disclosure of which is hereby incorporated by reference in its entirety.

TECHNICAL FIELD

Embodiments described herein relate to electrochemical cells and electrochemical cell systems having divided energy systems, and methods of making the same.

BACKGROUND

A battery or an electrochemical cell typically includes a single anode and a single cathode, each with one set of performance-related properties (e.g., capacity, power, thickness, chemistry). Cells with a single anode and a single cathode can often have performance properties that are excellent in some areas, but lacking in other areas. For example, a cell can have high energy density but low power density. In some cases, a cell can operate with high power density, but also have high heat generation. An enduring challenge is to create energy systems with complementary operational properties, such that a desired energy and power can be delivered to a system.

SUMMARY

Embodiments described herein relate to divided energy electrochemical cells and electrochemical cell systems. Divided energy electrochemical cells and electrochemical cell systems include a first electrochemical cell and a second electrochemical cell connected in parallel. Both electrochemical cells include a cathode disposed on a cathode current collector, an anode disposed on an anode current collector, and a separator disposed between the anode and the cathode. In some embodiments, the cathode current collector of the first electrochemical cell can also function as the cathode current collector of the second electrochemical cell. In some embodiments, the first electrochemical cell can have different performance properties from the second electrochemical cell. For example, the first electrochemical cell can have a high energy density while the second electrochemical cell can have a high power density. In some embodiments, the first electrochemical cell can have a battery chemistry, thickness, or any other physical/chemical property different from those properties of the second electrochemical cell. For example, the first electrochemical cell can have a first cathode chemistry (e.g., lithium iron phosphate), while the second electrochemical cell can have a second cathode chemistry (lithium nickel manganese cobalt oxide) different from the first cathode chemistry. In some embodiments, the anode and/or the cathode of the first electrochemical cell and/or the second electrochemical cell can be a semi-solid, binderless electrode. In some embodiments, the electrochemical cell system can include a third electrochemical cell or any number of additional electrochemical cells.

BRIEF DESCRIPTION OF THE DRAWINGS

FIG. 1 is a schematic illustration of a divided energy electrochemical cell system, according to an embodiment.

FIG. 2 is a schematic illustration of a divided energy electrochemical cell system, according to an embodiment.

FIG. 3 is a schematic illustration of a divided energy electrochemical cell system, according to an embodiment.

FIGS. 4A-4E illustrate a divided energy electrochemical cell system, according to an embodiment.

FIGS. 5A-5E illustrate a divided energy electrochemical cell system, according to an embodiment.

DETAILED DESCRIPTION

Figure 4A:
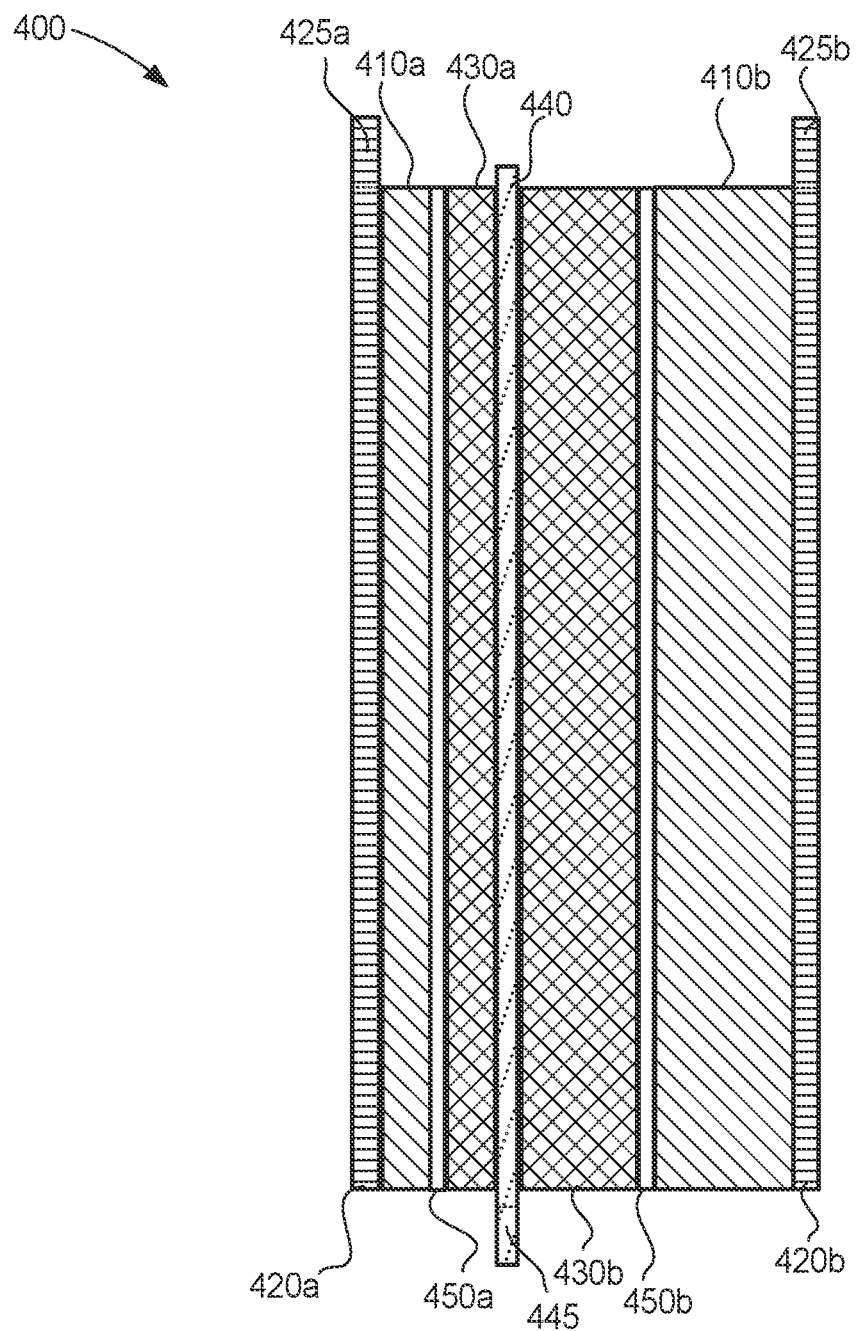

Embodiments described herein relate to divided energy electrochemical cells and electrochemical cell systems, and methods of making the same. More specifically, divided energy electrochemical cells and electrochemical cell systems include multiple anodes and multiple cathodes with different performance properties. Electrochemical cells often perform well by some metrics, but are lacking by other metrics. By combining multiple cell properties in a single electrochemical cell system, the electrochemical cell system can have improved performance in a wider range of metrics. For example, an electrochemical cell system can utilize the high capacity of a cell with a thick cathode (e.g., a cathode that includes lithium iron phosphate) and an anode (e.g., an anode that is lithium metal) while utilizing the high power density of a cell with a thinner cathode (e.g., a cathode that includes lithium iron phosphate) and an anode (e.g., an anode that includes graphite). Connecting two such cells in parallel to an external circuit can deliver high power density or high energy density on demand.

FIG. 1 is a schematic illustration of an electrochemical cell system 100 with a divided energy design, according to an embodiment. The electrochemical cell system 100 includes a first electrochemical cell 100a and a second electrochemical cell 100b. The first electrochemical cell 100a includes a first anode 110a disposed on a first anode current collector 120a, a first cathode 130a disposed on a first cathode current collector 140a, and a first separator 150a disposed between the first anode 110a and the first cathode 130a. The second electrochemical cell 100b includes a second anode 110b. In some embodiments, the second anode 110b can be disposed on a second anode current collector 120b. The second electrochemical cell 100b includes a second cathode 130b. In some embodiments, the second electrochemical cell 100b can include a second cathode current collector 140b. In some embodiments, the second cathode 130b can be disposed on the second cathode current collector 140b. The second electrochemical cell 100b includes a second separator 150b disposed between the second anode 110b and the second cathode 130b.

As shown, the electrochemical cell system 100 is arranged cathode-to-cathode in the parallel configuration and the second cathode current collector 140b is an optional component of the electrochemical cell system 100. In some embodiments, the second cathode 130b can be disposed on the first cathode current collector 140a, such that the first cathode current collector 140a acts as a cathode current collector for both the first electrochemical cell 100a and the second electrochemical cell 100b. In some embodiments, the second cathode 130*b* can be disposed on the second cathode current collector 140*b*. In some embodiments, a first surface of the first cathode current collector 140*a* can be coated with the first cathode 130*a*, while a second surface of the first cathode current collector 140*a* can be uncoated. In some embodiments, a first surface of the second cathode current collector 140*b* can be coated with the second cathode 130*b*, while a second surface of the second cathode current collector 140*b* can be uncoated. In some embodiments, the second surface of the first cathode current collector 140*a* can be coupled to the second surface of the second cathode current collector 140*b*.

In some embodiments, the electrochemical cell system 100 can be arranged anode-to-anode in the parallel configuration (not shown). In some embodiments, when the electrochemical cell system 100 is arranged anode-to anode, the second anode current collector 120*b* is an optional component of the electrochemical cell system 100. In some embodiments, the second anode 110*b* can be disposed on the first anode current collector 120*a*, such that the first anode current collector 120*a* acts as an anode current collector for both the first electrochemical cell 100*a* and the second electrochemical cell 100*b*. In some embodiments, the second anode 110*b* can be disposed on the second anode current collector 120*b*. In some embodiments, a first surface of the first anode current collector 120*a* can be coated with the first anode 110*a*, while a second surface of the first anode current collector 120*a* can be uncoated. In some embodiments, a first surface of the second anode current collector 120*b* can be coated with the second anode 110*b*, while a second surface of the second anode current collector 120*b* can be uncoated. In some embodiments, the second surface of the first anode current collector 120*a* can be coupled to the second surface of the second anode current collector 120*b*. In some embodiments, the first anode 110*a* can have the same or substantially similar chemical composition to the second anode 110*b*. In some embodiments, the first anode 110*a* can be different from the second anode 110*b*. In some embodiments, the first anode 110*a* can be different from the second anode 110*b* in chemical composition, thickness, density, porosity, and/or any other properties.

In some embodiments, the first electrochemical cell 100*a* can be disposed in a first pouch (not shown) and the second electrochemical cell 100*b* can be disposed in a second pouch (not shown). In some embodiments, the first electrochemical cell 100*a* and the second electrochemical cell 100*b* can be disposed in a single pouch.

In some embodiments, the first electrochemical cell 100*a* and/or the second electrochemical cell 100*b* can be a high power density cell. In some embodiments, the first electrochemical cell 100*a* and/or the second electrochemical cell 100*b* can be a high energy density cell. In some embodiments, the first electrochemical cell 100*a* and/or the second electrochemical cell 100*b* can be a high energy density cell with high heat production. In some embodiments, the first electrochemical cell 100*a* and/or the second electrochemical cell 100*b* can be a high energy density cell that performs with low efficiency at low temperatures. In some embodiments, the first electrochemical cell 100*a* and/or the second electrochemical cell 100*b* can have high capacity retention. In some embodiments, the first electrochemical cell 100*a* can be a high power density cell while the second electrochemical cell 100*b* can be a high energy density cell. In some embodiments, the first electrochemical cell 100*a* can be a high energy density cell with high heat production while the second electrochemical cell 100*b* can be a high energy density cell that performs with low efficiency at low temperatures. In some embodiments, the first electrochemical cell 100*a* can have a high energy density while the second electrochemical cell 100*b* can have high capacity retention.

In some embodiments, "high power density cell" can refer to an electrochemical cell with a cell specific power output of at least about 400 W/kg, at least about 450 W/kg, at least about 500 W/kg, at least about 550 W/kg, at least about 600 W/kg, or at least about 650 W/kg, or at least about 700 W/kg, inclusive of all values and ranges therebetween.

In some embodiments, "high energy density cell" can refer to an electrochemical cell with a cell specific energy density of at least about 250 W·h/kg when discharged at 1C, at least about 300 W·h/kg when discharged at 1C, at least about 350 W·h/kg when discharged at 1C, at least about 400 W·h/kg when discharged at 1C, or at least about 450 W·h/kg when discharged at 1C, inclusive of all values and ranges therebetween In some embodiments, "high energy density cell" can refer to an electrochemical cell with a specific energy density of at least about 250 W·h/kg when discharged at C/2, at least about 300 W·h/kg when discharged at C/2, at least about 350 W·h/kg when discharged at C/2, at least about 400 W·h/kg when discharged at C/2, or at least about 450 W·h/kg when discharged at C/2, inclusive of all values and ranges therebetween In some embodiments, "high energy density cell" can refer to an electrochemical cell with a specific energy density of at least about 250 W·h/kg when discharged at C/4, at least about 300 W·h/kg when discharged at C/4, at least about 350 W·h/kg when discharged at C/4, at least about 400 W·h/kg when discharged at C/4, or at least about 450 W·h/kg when discharged at C/4, inclusive of all values and ranges therebetween.

In some embodiments, "cell with high heat production" can refer to an electrochemical cell, wherein at least about 20%, at least about 25%, at least about 30%, at least about 35%, at least about 40%, at least about 45%, or at least about 50% of the energy generated is lost as heat, inclusive of all values and ranges therebetween.

In some embodiments, a "cell that performs with low efficiency at low temperatures" can refer to a cell that loses at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or about 100% of its discharge capacity when operated at −20° C., as compared to operation at room temperature, inclusive of all values and ranges therebetween.

In some embodiments, "high capacity retention" can refer to an electrochemical cell that retains at least about 80%, at least about 85%, at least about 90%, at least about 95%, at least about 96%, at least about 97%, at least about 98%, or at least about 99% of its initial discharge capacity after 1,000 cycles, inclusive of all values and ranges therebetween.

In some embodiments, the first anode 110*a* and/or the second anode 110*a* (collectively referred to as anodes 110) can include graphite, lithium metal (Li), sodium metal (Na), silicon oxide (SiO), graphite, silicon, carbon, lithium-intercalated carbon, lithium nitrides, lithium alloys, lithium alloy forming compounds, or any other anode active material, inclusive of all combinations thereof. In some embodiments, the lithium alloy forming compounds can include silicon, bismuth, boron, gallium, indium, zinc, tin, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon carbide, silicon-graphite composite. In some embodiments, the first cathode 130a and/or the second cathode 130b (collectively referred to as cathodes 130) can include Lithium cobalt oxide (LCO), lithium nickel manganese cobalt oxide (NMC), lithium iron phosphate (LFP), or any other cathode active material, inclusive of all combinations thereof. In some embodiments, the first electrochemical cell 100a and/or the second electrochemical cell 100b can include one or more electrolyte solutions. Electrolyte solutions can include ethylene carbonate (EC), gamma-butyrolactone (GBL), Lithium bis(fluorosulfonyl) imide (LiFSI), trioctyl phosphate (TOP), propylene carbonate (PC), dimethoxyethane (DME), bis(trifluoromethanesulfonyl)imide (TSFI), $Li_{1.4}Al_{0.4}Ti_{1.6}(PO_4)_3$ (LATP), and any combinations thereof. Additional examples of active materials, conductive materials, and electrolyte solutions that can be incorporated in the first electrochemical cell 100a and/or the second electrochemical cell 100b are described in U.S. Pat. No. 9,484,569, entitled, "Electrochemical Slurry Compositions and Methods of Preparing the Same," ("the '569 patent") and in U.S. Pat. No. 9,437,864 entitled, "Asymmetric Battery Having a Semi-Solid Cathode and High Energy Density Anode," registered Sep. 6, 2016 ("the '864 patent), the disclosures of which are incorporated herein by reference in their entirety.

In some embodiments, the first separator 150a and/or the second separator 150b (collectively referred to as separators 150) can include a selectively permeable membrane, such that the anodes 110 and cathodes 130 are fluidically and/or chemically isolated from each other. This can allow for independent optimization of the properties of each of the electrodes. Examples of electrochemical cells that include a separator with a selectively permeable membrane that can chemically and/or fluidically isolate the anode from the cathode while facilitating ion transfer during charge and discharge of the cell are described in U.S. Patent Publication No. 2019/0348705, entitled, "Electrochemical Cells Including Selectively Permeable Membranes, Systems and Methods of Manufacturing the Same," filed Jan. 8, 2019 ("the '705 publication"), the disclosure of which is incorporated herein by reference in its entirety.

In some embodiments, the first anode 110a and/or the second anode 110b can be a semi-solid electrode. In some embodiments, the first cathode 130a and/or the second cathode 130b can be a semi-solid electrode. In comparison to conventional electrodes, semi-solid electrodes can be made (i) thicker (e.g., greater than about 250 µm-up to about 2,000 µm or even greater) due to the reduced tortuosity and higher electronic conductivity of semi-solid electrodes, (ii) with higher loadings of active materials, (iii) with a simplified manufacturing process utilizing less equipment, and (iv) can be operated between a wide range of C-rates while maintaining a substantial portion of their theoretical charge capacity. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein, are binderless and/or do not use binders that are used in conventional battery manufacturing. Instead, the volume of the electrode normally occupied by binders in conventional electrodes, is now occupied, by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. In some embodiments, the first cathode 130a can have the same or substantially similar chemical composition to the second cathode 130b. In some embodiments, the first cathode 130a can be different from the second cathode 130b. In some embodiments, the first cathode 130a can be different from the second cathode 130b in chemical composition, thickness, density, porosity, and/or any other properties.

Since the semi-solid electrodes described herein can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein. The use of semi-solid, binderless electrodes can also be beneficial in the incorporation of an overcharge protection mechanism, as generated gas can migrate to the electrode/current collector interface without binder particles inhibiting the movement of the gas within the electrode.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in a liquid electrolyte to produce a semi-solid electrode. Examples of electrochemical cells that include a semi-solid and/or binderless electrode material are described in U.S. Pat. No. 8,993,159 entitled, "Semi-solid Electrodes Having High Rate Capability," registered Mar. 31, 2015 ("the '159 patent"), the disclosure of which is incorporated herein by reference in its entirety.

In some embodiments, the first electrochemical cell 100a and/or the second electrochemical cell 100b can include conventional electrodes (e.g., solid electrodes with binders). In some embodiments, the thickness of the conventional electrodes can be in the range of about 20 µm to about 100 µm, about 20 µm to about 90 µm, about 20 µm to about 80 µm, about 20 µm to about 70 µm, about 20 µm to about 60 µm, about 25 µm to about 60 µm, about 30 µm to about 60 µm, about 20 µm to about 55 µm, about 25 µm to about 55 µm, about 30 µm to about 55 µm, about 20 µm to about 50 µm, about 25 µm to about 50 µm, or about 30 µm to about 50 µm, inclusive of all values and ranges therebetween. In some embodiments, the thickness of the conventional electrodes can be about 20 µm, about 25 µm, about 30 µm, about 35 µm, about 40 µm, about 45 µm, about 50 µm, about 55 µm, or about 60 µm, inclusive of all values and ranges therebetween.

In some embodiments, the first anode 110a and/or the second anode 110b can have a thickness of at least about 20 µm, at least about 30 µm, at least about 40 µm, at least about 50 µm, at least about 60 µm, at least about 70 µm, at least about 80 µm, at least about 90 µm, at least about 100 µm, at least about 110 µm, at least about 120 µm, at least about 130 µm, or at least about 140 µm. In some embodiments, the first anode 110*a* and/or the second anode 110*b* can have a thickness of no more than about 150 µm, no more than about 140 µm, no more than about 130 µm, no more than about 120 µm, no more than about 110 µm, no more than about 100 µm, no more than about 90 µm, no more than about 80 µm, no more than about 70 µm, no more than about 60 µm, no more than about 50 µm, or no more than about 30 µm. Combinations of the above-referenced thicknesses of the first anode 110*a* and/or the second anode 110*b* are also possible (e.g., at least about 20 µm and no more than about 150 µm or at least about 50 µm and no more than about 100 µm), inclusive of all values and ranges therebetween. In some embodiments, the first anode 110*a* and/or the second anode 110*b* can have a thickness of about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, or about 150 µm.

In some embodiments, the second anode 110*b* can have a thickness the same or substantially similar to a thickness of the first anode 110*a*. In some embodiments, the second anode 110*b* can have a thickness greater than the thickness of the first anode 110*a*. In some embodiments, the second anode 110*b* can be thicker than the first anode 110*a* by a factor of at least about 1, at least about 1.1, at least about 1.2, at least about 1.3, at least about 1.4, at least about 1.5, at least about 1.6, at least about 1.7, at least about 1.8, at least about 1.9, at least about 2, at least about 2.5, at least about 3, at least about 3.5, at least about 4, at least about 4.5, or at least about 5.

In some embodiments, the first cathode 130*a* and/or the second cathode 130*b* can have a thickness of at least about 50 µm, at least about 60 µm, at least about 70 µm, at least about 80 µm, at least about 90 µm, at least about 100 µm, at least about 110 µm, at least about 120 µm, at least about 130 µm, at least about 140 µm, at least about 150 µm, at least about 200 µm, at least about 250 µm, at least about 300 µm, at least about 350 µm, at least about 400 µm, or at least about 450 µm. In some embodiments, the first cathode 130*a* and/or the second cathode 130*b* can have a thickness of no more than about 500 µm, no more than about 450 µm, no more than about 400 µm, no more than about 350 µm, no more than about 300 µm, no more than about 250 µm, no more than about 200 µm, no more than about 150 µm, no more than about 140 µm, no more than about 130 µm, no more than about 120 µm, no more than about 110 µm, no more than about 100 µm, no more than about 90 µm, no more than about 80 µm, no more than about 70 µm, or no more than about 60 µm. Combinations of the above-referenced thicknesses of the first cathode 130*a* and/or the second cathode 130*b* are also possible (e.g., at least about 50 µm and no more than about 500 µm or at least about 100 µm and no more than about 300 µm), inclusive of all values and ranges therebetween. In some embodiments, the first cathode 130*a* and/or the second cathode 130*b* can have a thickness of about 50 µm, about 60 µm, about 70 µm, about 80 µm, about 90 µm, about 100 µm, about 110 µm, about 120 µm, about 130 µm, about 140 µm, about 150 µm, about 200 µm, about 250 µm, about 300 µm, about 350 µm, about 400 µm, about 450 µm, or about 500 µm.

In some embodiments, the second cathode 130*b* can have a thickness the same or substantially similar to a thickness of the first cathode 130*a*. In some embodiments, the second cathode 130*b* can have a thickness greater than the thickness of the first cathode 130*a*. In some embodiments, the second cathode 110*b* can be thicker than the first cathode 110*a* by a factor of at least about 1, at least about 1.1, at least about 1.2, at least about 1.3, at least about 1.4, at least about 1.5, at least about 1.6, at least about 1.7, at least about 1.8, at least about 1.9, at least about 2, at least about 2.5, at least about 3, at least about 3.5, at least about 4, at least about 4.5, or at least about 5.

In some embodiments, the first electrochemical cell 100*a* and/or the second electrochemical cell 100*b* can have a thickness of at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, or at least about 950 µm. In some embodiments, the first electrochemical cell 100*a* and/or the second electrochemical cell 100*b* can have a thickness of no more than about 1,000 µm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, or no more than about 150 µm. Combinations of the above-referenced thicknesses of the first electrochemical cell 100*a* and/or the second electrochemical cell 100*b* are also possible (e.g., at least about 100 µm and no more than about 1,000 µm or at least about 200 µm and no more than about 500 µm), inclusive of all values and ranges therebetween. In some embodiments, the first electrochemical cell 100*a* and/or the second electrochemical cell 100*b* can have a thickness of about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, or about 1,000 µm.

In some embodiments, the second electrochemical cell 100*b* can have a thickness the same or substantially similar to a thickness of the first electrochemical cell 100*a*. In some embodiments, the second electrochemical cell 100*b* can have a thickness greater than the thickness of the first electrochemical cell 100*a*. In some embodiments, the second electrochemical cell 100*b* can be thicker than the first electrochemical cell 100*a* by a factor of at least about 1, at least about 1.1, at least about 1.2, at least about 1.3, at least about 1.4, at least about 1.5, at least about 1.6, at least about 1.7, at least about 1.8, at least about 1.9, at least about 2, at least about 2.5, at least about 3, at least about 3.5, at least about 4, at least about 4.5, or at least about 5.

In some embodiments, the electrochemical cell system 100 can have a first internal resistance (IR). In some embodiments, the first electrochemical cell 100*a* can have a second IR when operated individually and the second electrochemical cell 100*b* can have a third IR when operated individually. In some embodiments, the first IR can be less than the minimum of the second IR and the third IR by at least about 30%, at least about 35%, at least about 40%, at least about 45%, at least about 50%, at least about 55%, or at least about 60%, inclusive of all values and ranges therebetween.

In some embodiments, the electrochemical cell system 100 can have self-heating properties. For example, the IR of the first electrochemical cell 100*a* can be greater than the IR of the second electrochemical cell 100b, such that a temperature of the first electrochemical cell 100a can increase during operation more than a temperature of the second electrochemical cell 100b. Heat can then transfer from the first electrochemical cell 100a to the second electrochemical cell 100b to increase reaction rates and diffusivity in the second electrochemical cell 100b.

In some embodiments, the electrochemical cell system 100 can include a third electrochemical cell (not shown). In some embodiments, the electrochemical cell system 100 can include 4, 5, 6, 7, 8, 9, 10 or more electrochemical cells. In some embodiments, a selection of many different battery properties can be combined into the electrochemical cell system 100 in order to manipulate the performance properties of the electrochemical cell system 100 as desired.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as a particle suspension, a slurry, a colloidal suspension, an emulsion, a gel, or a micelle.

As used herein, the term "conventional separator" means an ion permeable membrane, film, or layer that provides electrical isolation between an anode and a cathode, while allowing charge-carrying ions to pass therethrough. Conventional separators do not provide chemical and/or fluidic isolation of the anode and cathode.

Typical current collectors for lithium cells include copper, aluminum, or titanium for the negative current collector and aluminum for the positive current collector, in the form of sheets or mesh, or any combination thereof. Current collector materials can be selected to be stable at the operating potentials of the positive and negative electrodes of electrochemical cells 100a and 100b. For example, in non-aqueous lithium systems, the first cathode current collector 140a and/or the second cathode current collector 140b (collectively referred to as cathode current collectors 140) can include aluminum, or aluminum coated with conductive material that does not electrochemically dissolve at operating potentials of 2.5-5.0V with respect to $Li/Li^+$. Such materials include platinum, gold, nickel, conductive metal oxides such as vanadium oxide, and carbon. The first anode current collector 120a and/or the second anode current collector 120b (collectively referred to as anode current collectors 120) can include copper or other metals that do not form alloys or intermetallic compounds with lithium, carbon, and/or coatings comprising such materials disposed on another conductor.

FIG. 2 is a schematic illustration of an electrochemical cell system 200 with a divided energy design, according to an embodiment. The electrochemical cell system 200 includes a first electrochemical cell 200a and a second electrochemical cell 200b. As shown, both the first electrochemical cell 200a and the second electrochemical cell 200b are disposed in a single pouch 260. In some embodiments, the first electrochemical cell 200a can be physically coupled to the second electrochemical cell 200b. In some embodiments, the first electrochemical cell 200a and the second electrochemical cell can share a common anode current collector (not shown) or a common cathode current collector (not shown). In some embodiments, the first electrochemical cell 200a can have a first battery chemistry and the second electrochemical cell 200b can have a second battery chemistry, different from the first battery chemistry. In some embodiments, the first electrochemical cell 200a and the second electrochemical cell 200b can be the same or substantially similar to the first electrochemical cell 100a and the second electrochemical cell 100b as described above with reference to FIG. 1.

FIG. 3 is a schematic illustration of an electrochemical cell system 300 with a divided energy design, according to an embodiment. The electrochemical cell system 300 includes a first electrochemical cell 300a and a second electrochemical cell 300b. As shown, the first electrochemical cell 300a is disposed in a first pouch 360a and the second electrochemical cell 300b is disposed in a second pouch 360b. In some embodiments, the first electrochemical cell 300a and the second electrochemical cell 300b can be connected in parallel. In some embodiments, the first electrochemical cell 300a can have a first battery chemistry and the second electrochemical cell 300b can have a second battery chemistry, different from the first battery chemistry. In some embodiments, the first electrochemical cell 300a and the second electrochemical cell 300b can be the same or substantially similar to the first electrochemical cell 100a and the second electrochemical cell 100b as described above with reference to FIG. 1.

Figure 4B:
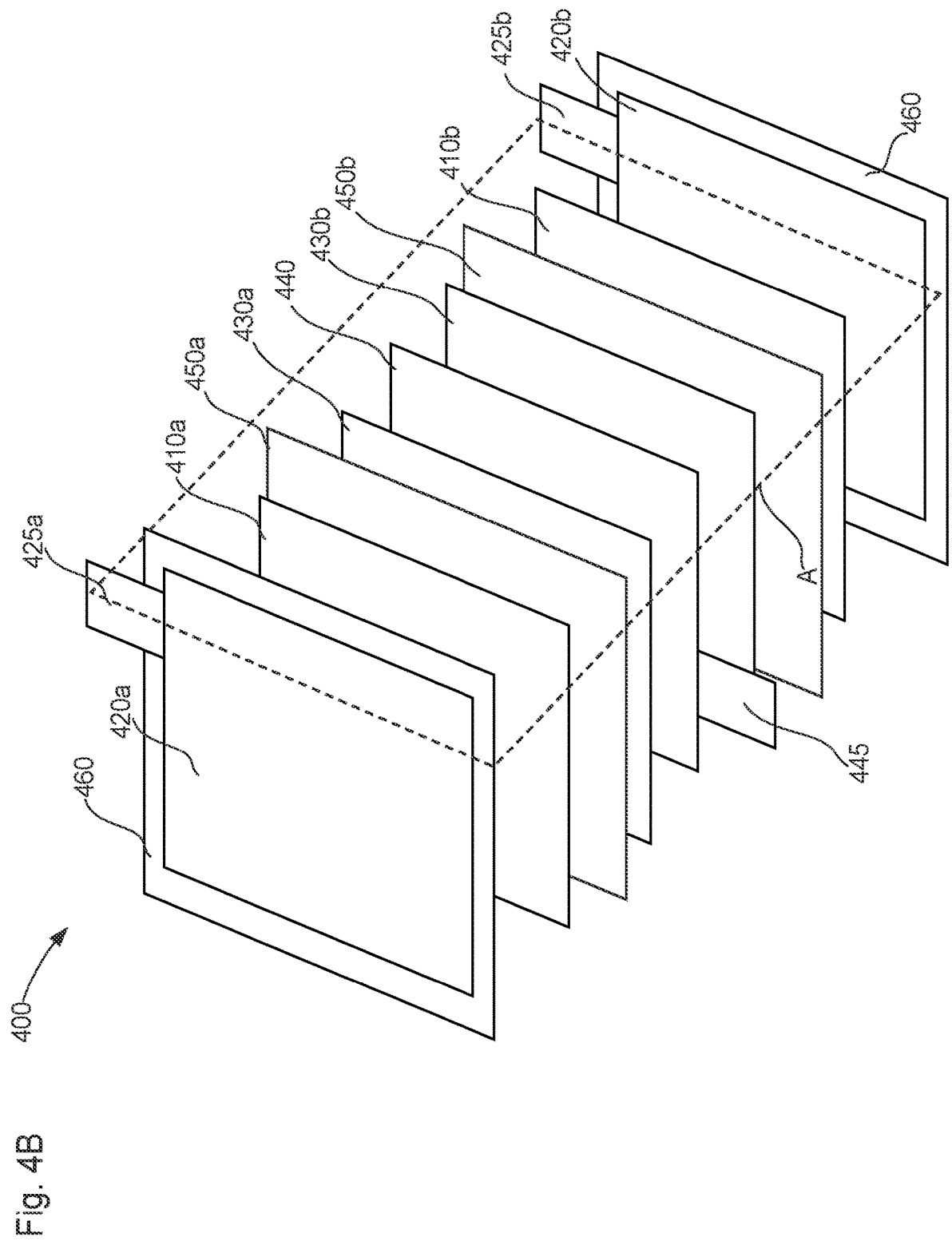
Figure 4D:
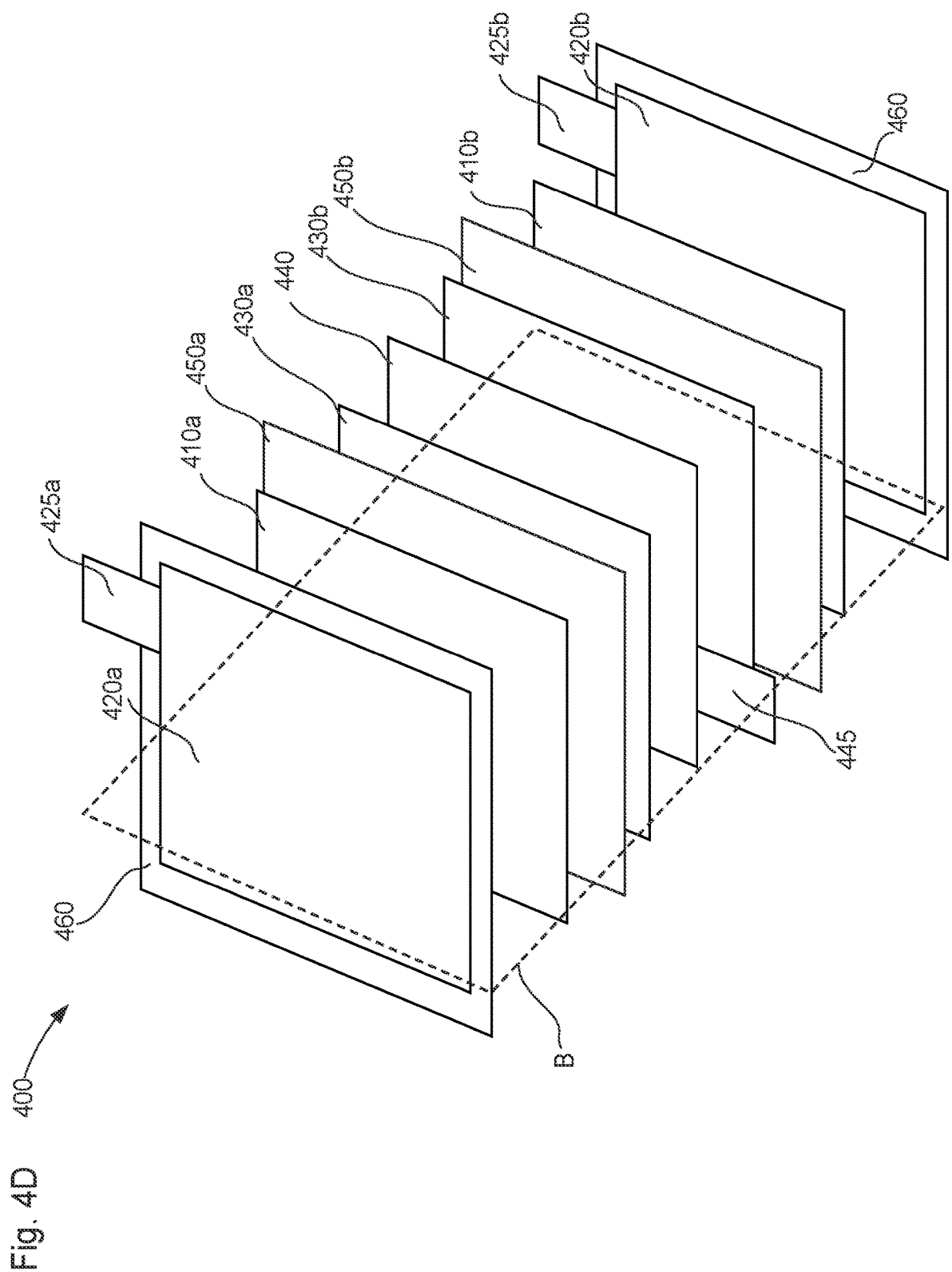
Figure 4E:
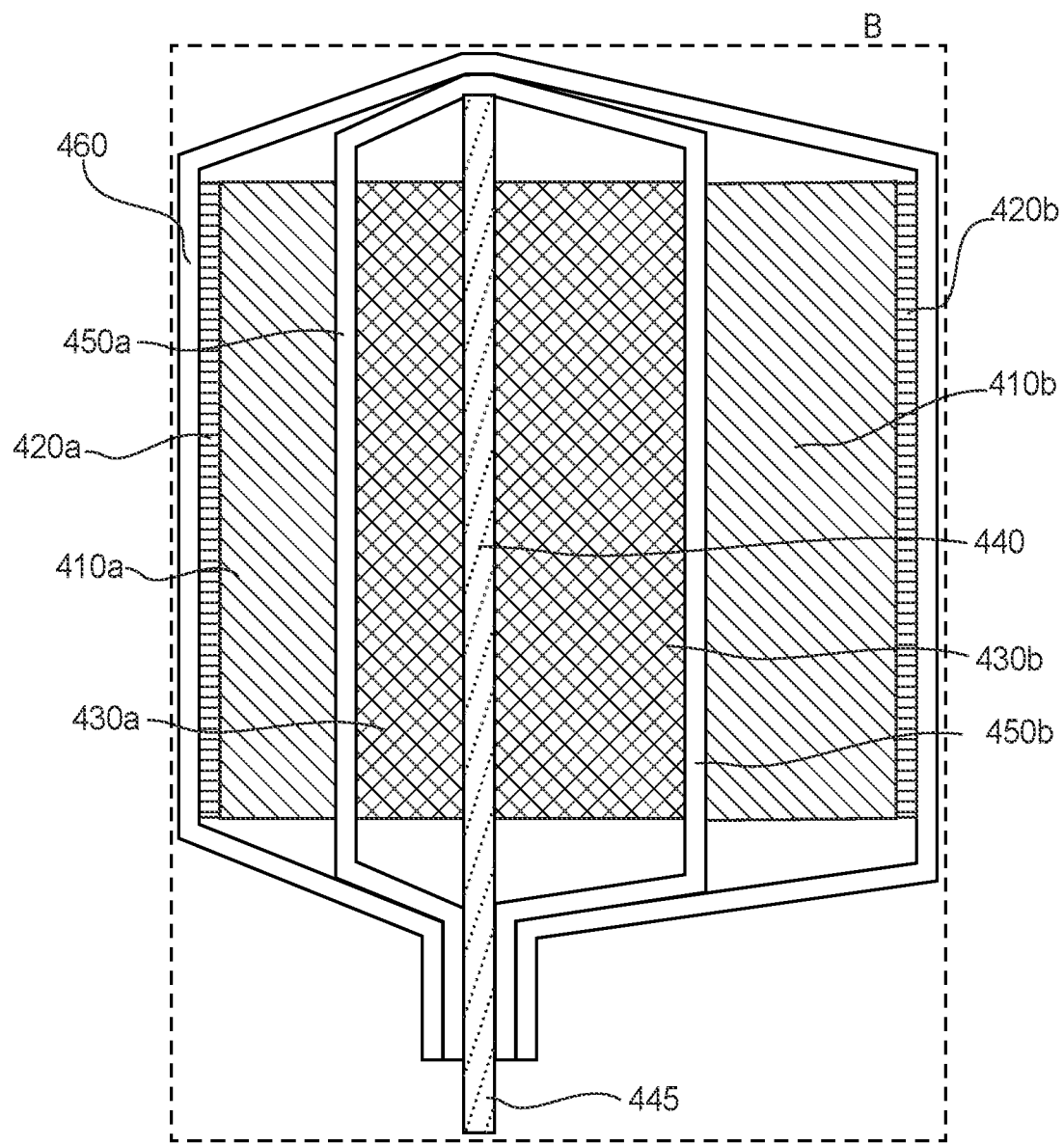

FIGS. 4A-4E illustrate an electrochemical cell system 400 with a divided energy design, according to an embodiment. The electrochemical cell system 400 includes a first anode 410a disposed on a first anode current collector 420a, a second anode 410b disposed on a second anode current collector 420b, a first cathode 430a disposed on a cathode current collector 440, a second cathode 430b disposed on the current collector 440, a first separator 450a disposed between the first anode 410a and the first cathode 430a, and a second separator 450b disposed between the second anode 410b and the second cathode 430b. The first anode current collector 420a includes a first anode weld tab 425a, the second anode current collector 420b includes a second anode weld tab 425b, and the cathode current collector 440 includes a cathode weld tab 445. Each of the aforementioned components is disposed in a single pouch 460. In some embodiments, the first anode weld tab 425a and the second anode weld tab 425b can be on the same side of the electrochemical cell system 400, as depicted in FIGS. 4A-4E. FIG. 4B is an auxiliary view of the electrochemical cell system 400 with surface A oriented through the first anode weld tab 425a and the second anode weld tab 425b, while FIG. 4C is a cross-sectional view along surface A. FIG. 4D is an auxiliary view of the electrochemical cell system 400 with surface B oriented through the cathode weld tab 445, while FIG. 4E is a cross-sectional view along surface B.

In some embodiments, the first anode 410a, second anode 410b, first anode current collector 420a, second anode current collector 420b, first cathode 430a, second cathode 430b, cathode current collector 440, first separator 450a, and the second separator 450b, can have the same or substantially similar properties to the first anode 110a, second anode 110b, first anode current collector 120a, second anode current collector 120b, first cathode 130a, second cathode 130b, cathode current collector 140a, first separator 150a, and the second separator 150b as described above with reference to FIG. 1. As shown, the second anode 410b has a thickness greater than the thickness of the first anode 410a and the second cathode 430b has a thickness greater than a thickness of the first cathode 430a. In some embodiments, the thickness of the second anode 410b can be the same or substantially similar to the thickness of the first anode 410a. In some embodiments, the thickness of the second cathode 430b can be the same or substantially similar to the thickness of the first cathode 430a. As shown, the edges of the cathode current collector 440 extend beyond the edges of the first cathode 430a and the second cathode 430b and bond to the first separator 450a and the second separator 450b. This creates fluidic isolation between the first cathode 430a and the second cathode 430b. With this fluidic isolation, the first cathode 430a can include a first electrolyte solution while the second cathode 430b can include a second electrolyte solution, wherein the second electrolyte solution is different from the first electrolyte solution. In some embodiments, the edges of the cathode current collector 440 can be flush with the edges of the first cathode 430a and the second cathode 430b, such that the first cathode 430a and the second cathode 430b are in fluidic communication.

Figure 5B:
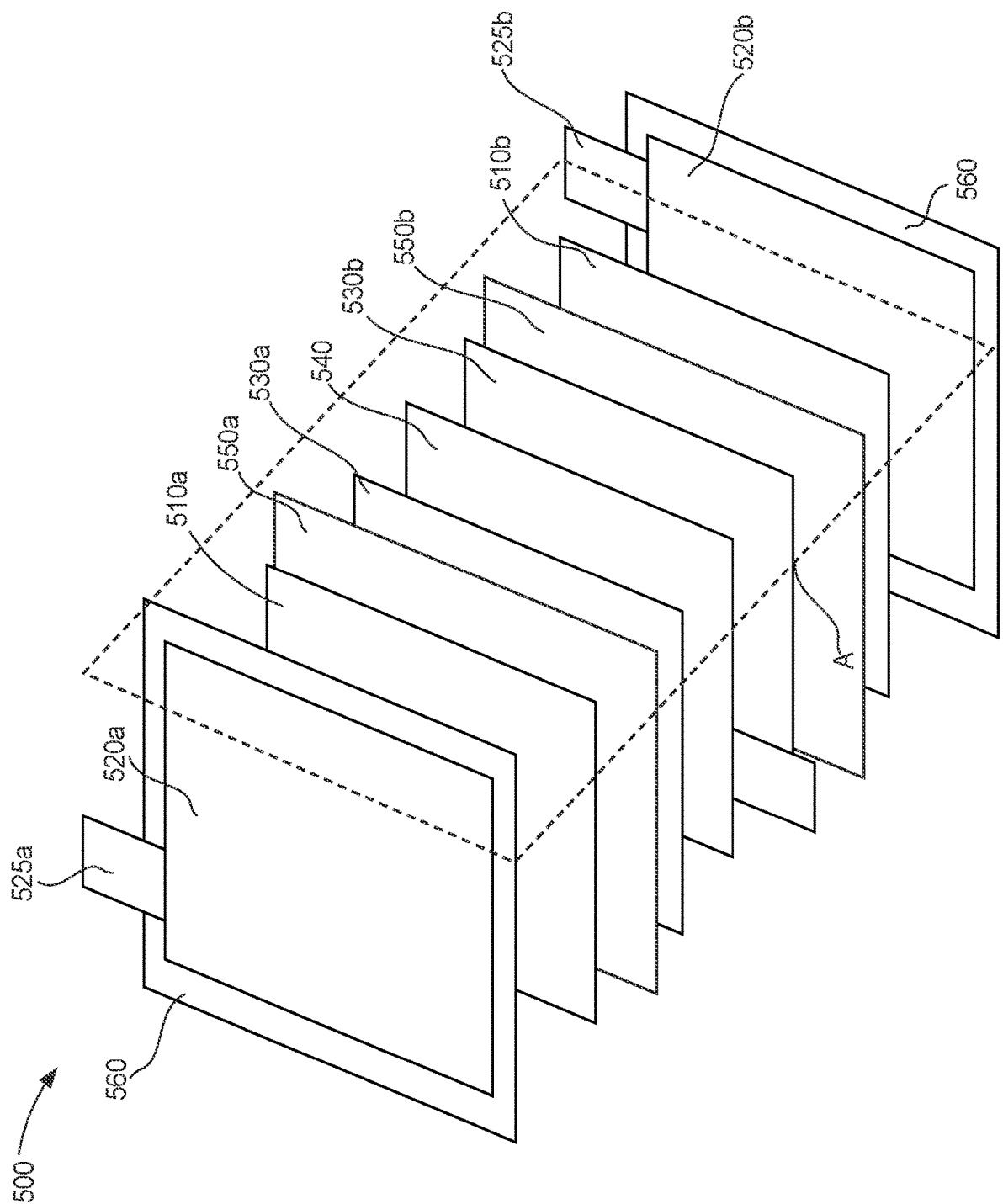
Figure 5D:
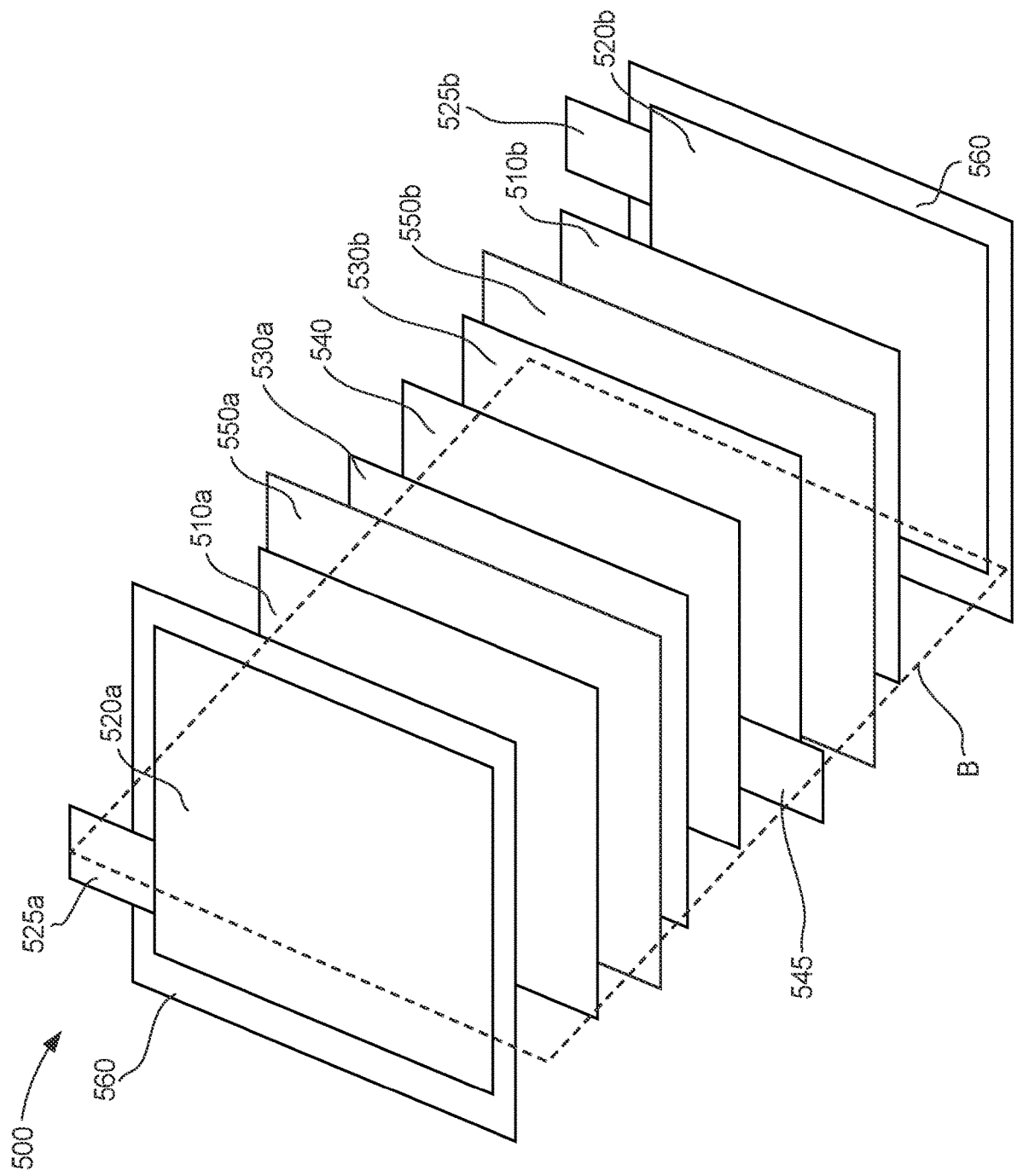
Figure 5E:
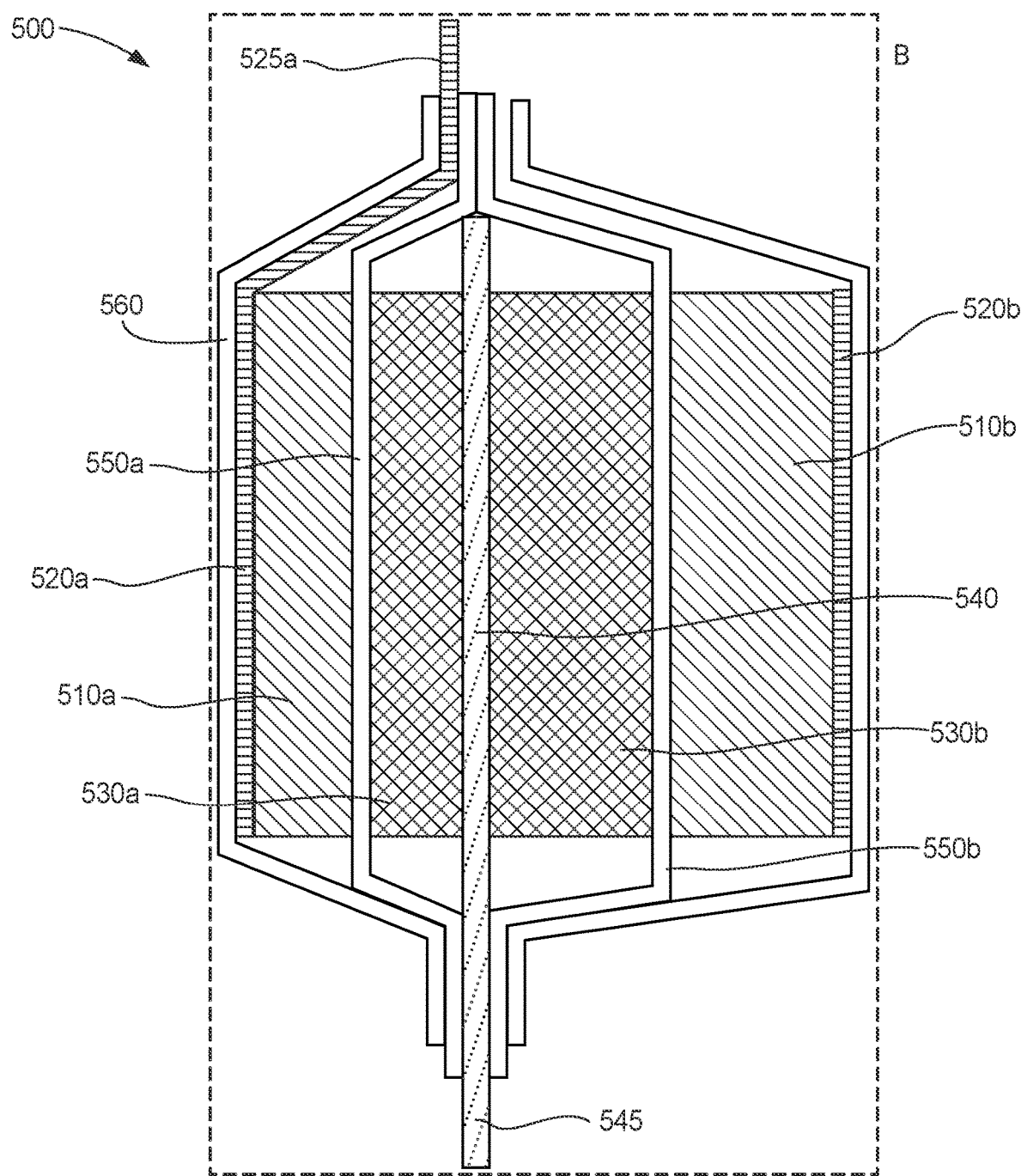
Figure 6A:
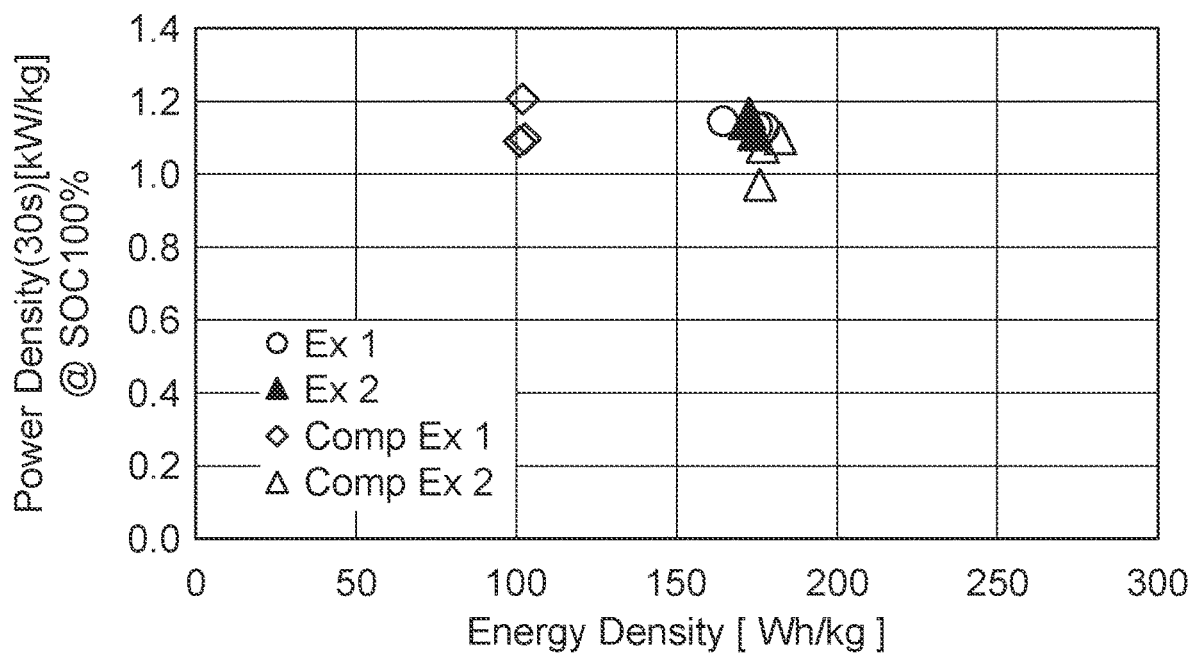
FIGS. 6A-6J show Ragone plots of divided energy electrochemical cell systems, as compared to single electrochemical cells.
Figure 6B:
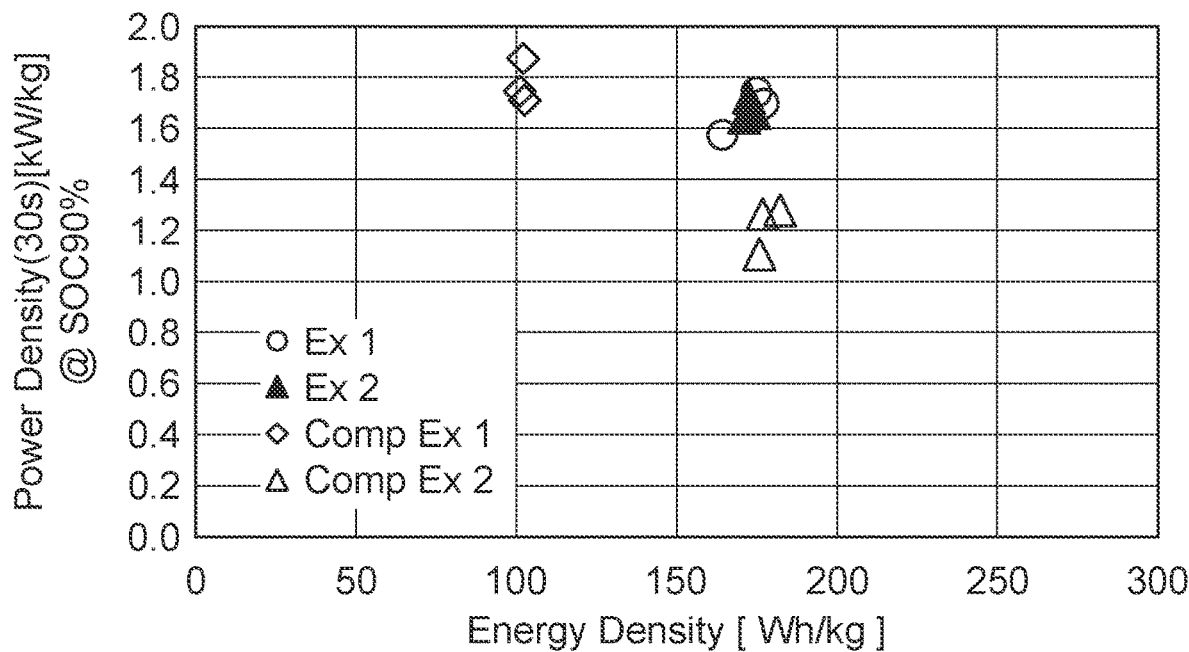
Figure 6C:
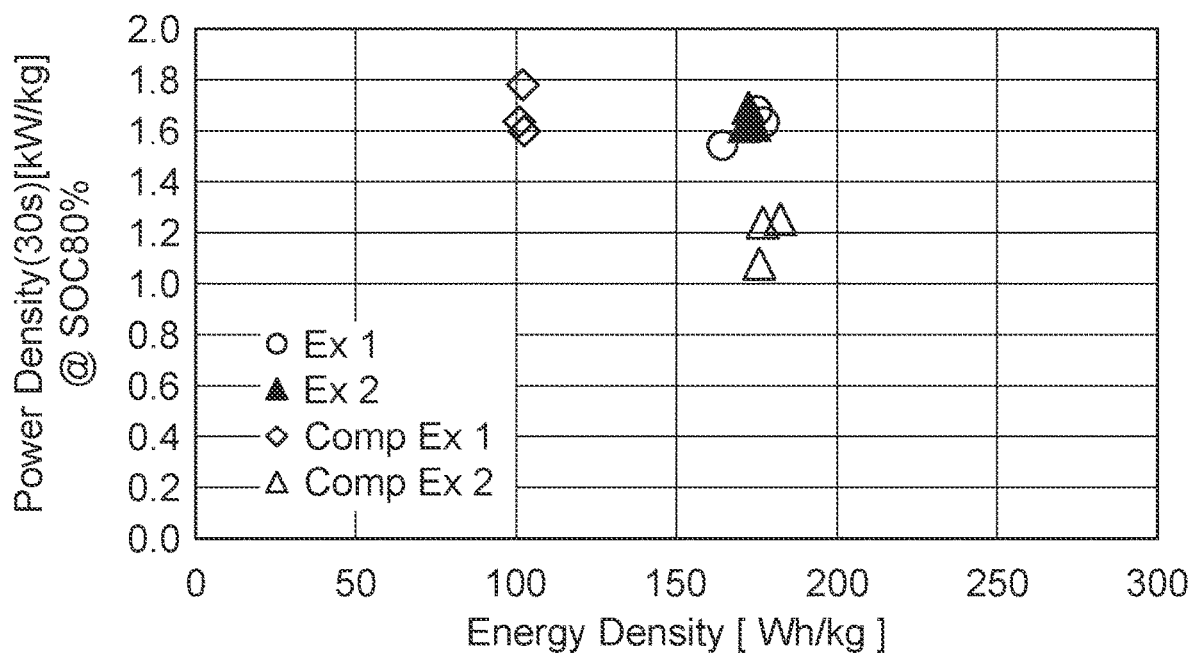
Figure 6D:
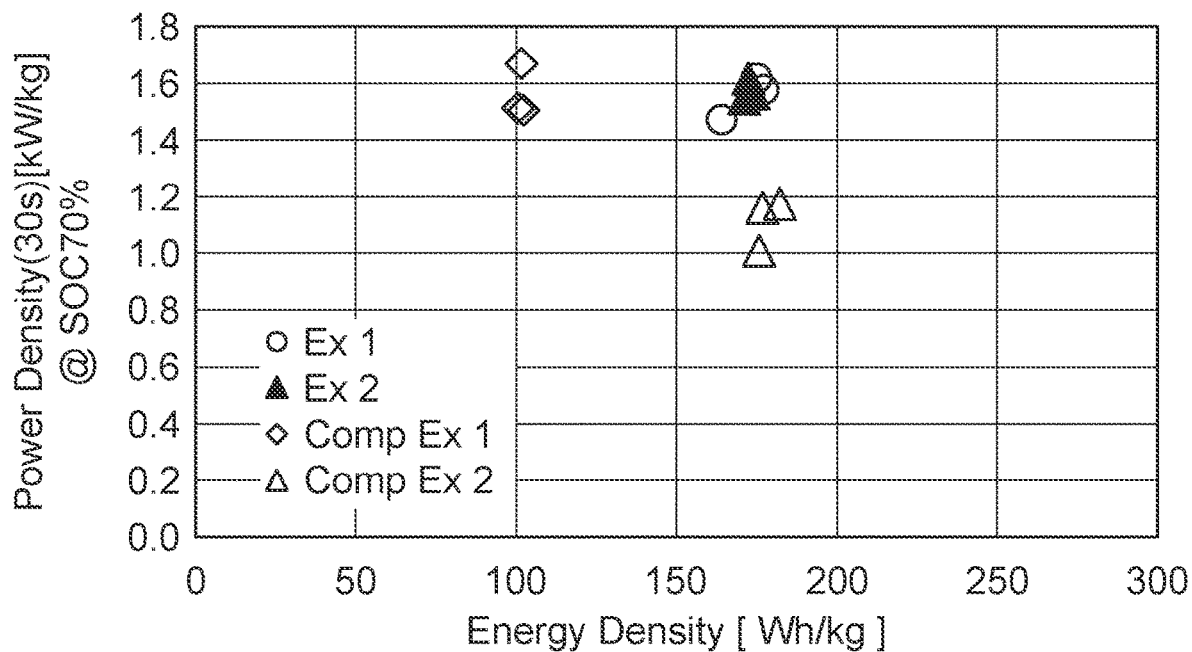
Figure 6E:
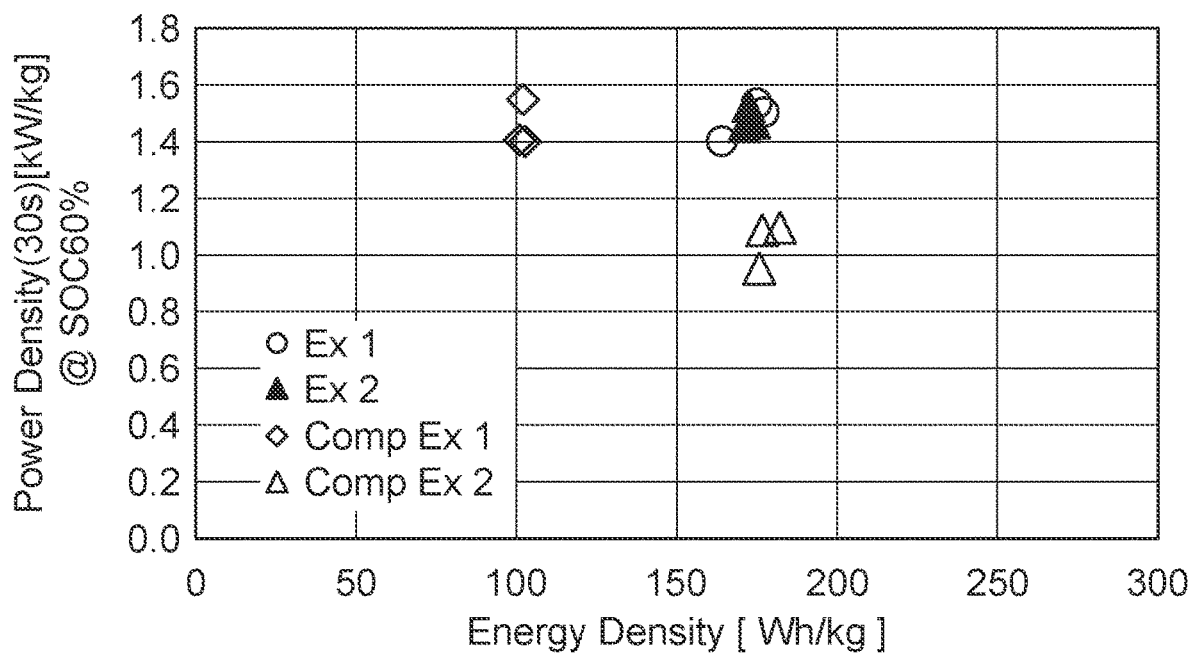
Figure 6F:
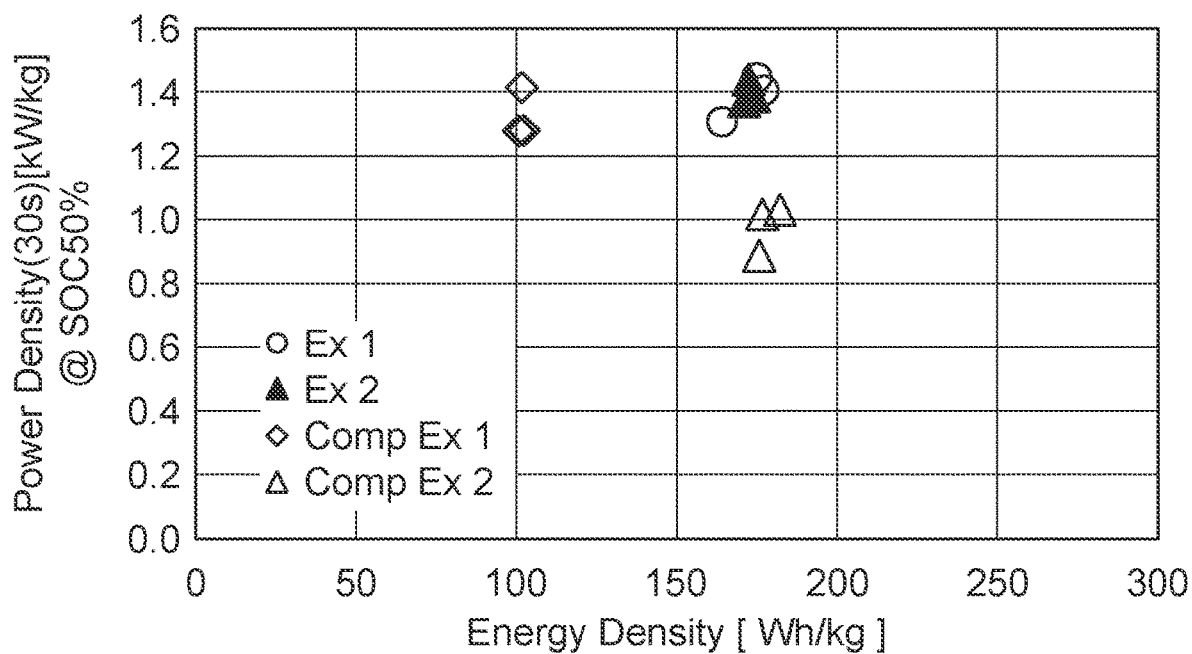
Figure 6G:
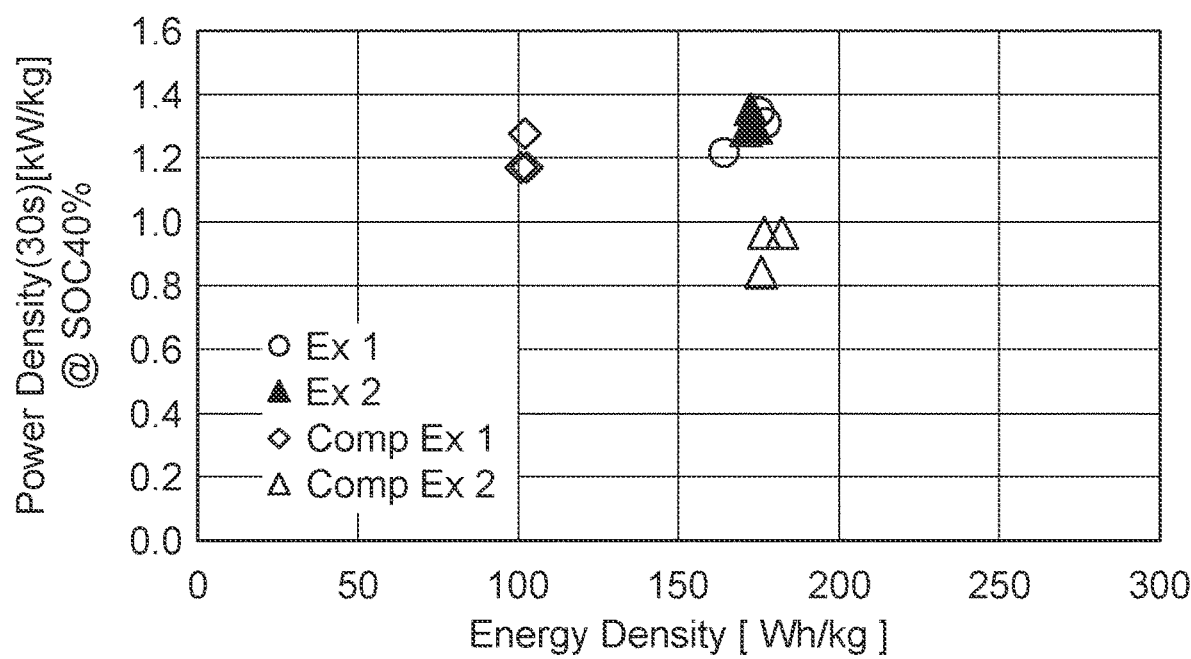
Figure 6H:
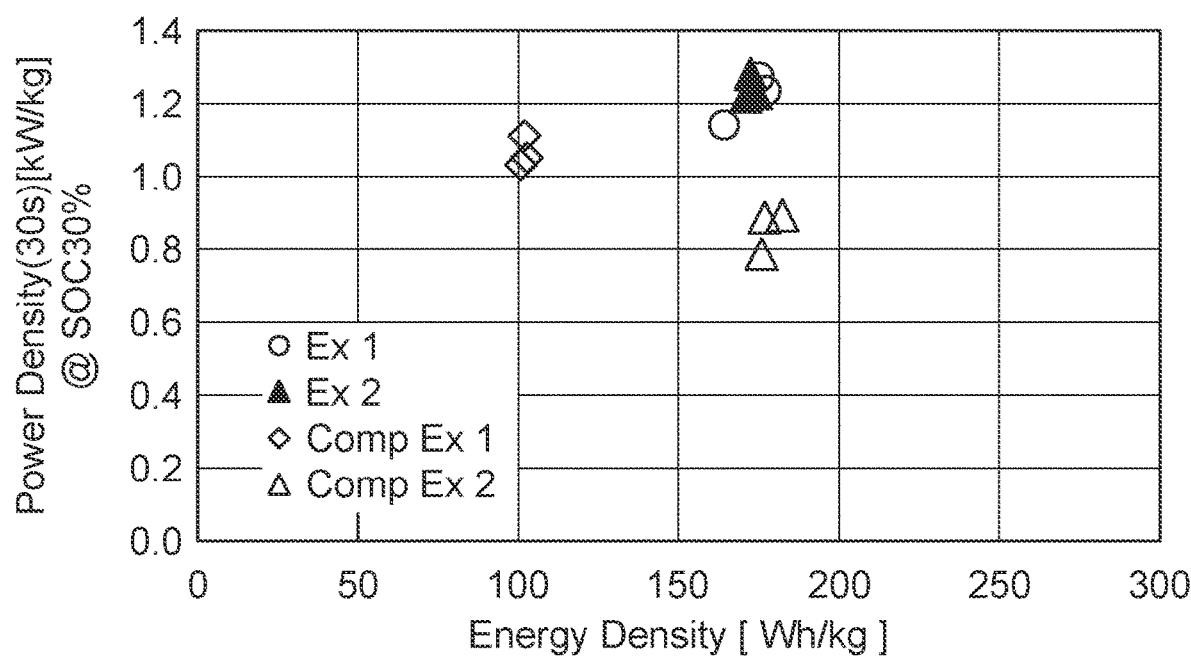
Figure 6I:
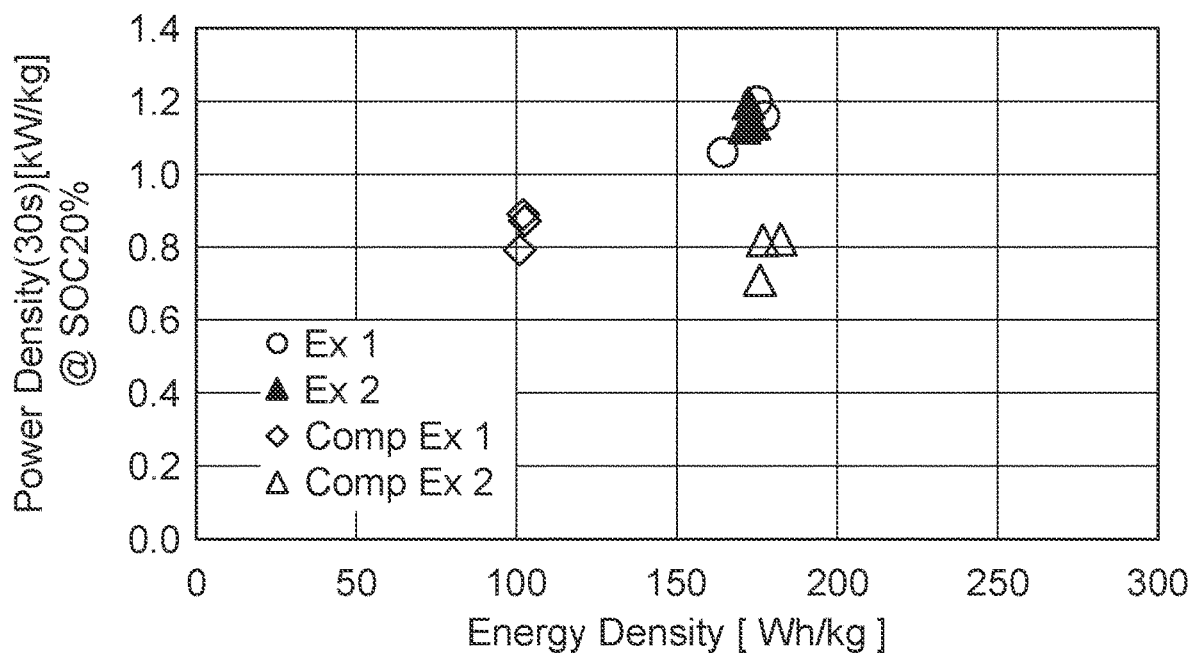
Figure 6J:
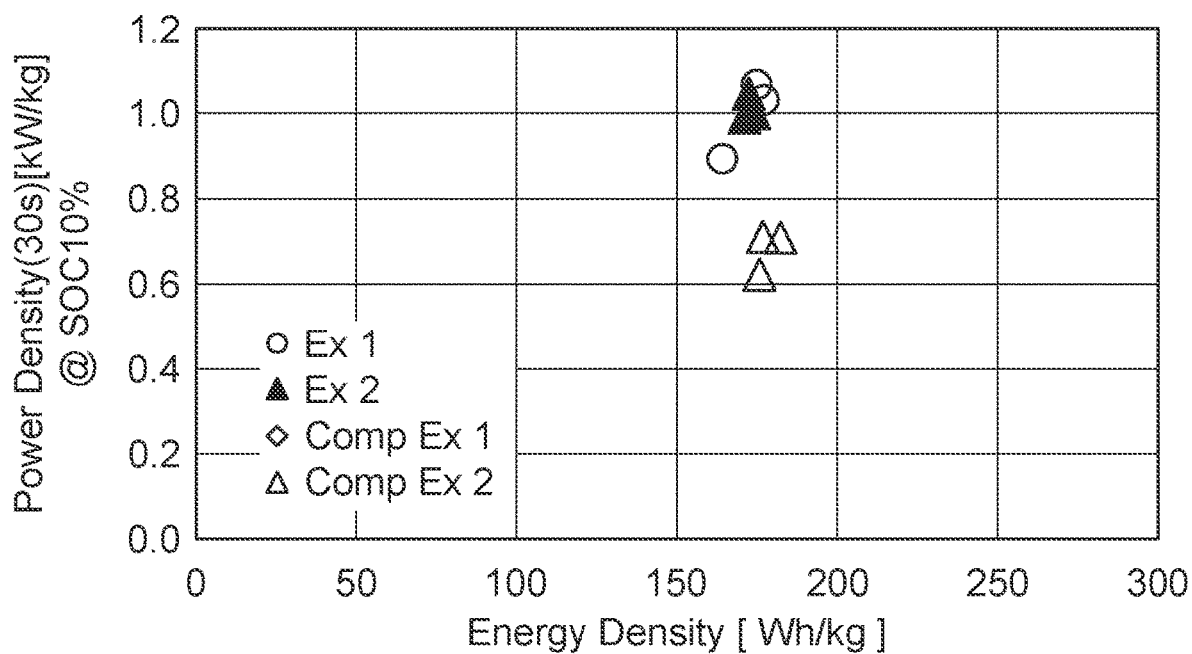

FIGS. 5A-5E illustrate an electrochemical cell system 500 with a divided energy design, according to an embodiment. The electrochemical cell system 500 includes a first anode 510a disposed on a first anode current collector 520a, a second anode 510b disposed on a second anode current collector 520b, a first cathode 530a disposed on a cathode current collector 540, a second cathode 530b disposed on the current collector 540, a first separator 550a disposed between the first anode 510a and the first cathode 530a, and a second separator disposed 550b between the second anode 510b and the second cathode 530b. The first anode current collector 520a includes a first anode weld tab 525a, the second anode current collector 520b includes a second anode weld tab 525b, and the cathode current collector 540 includes a cathode weld tab 545. Each of the aforementioned components is disposed in a single pouch 560. In some embodiments, the first anode weld tab 525a and the second anode weld tab 525b can be on the opposite side of the electrochemical cell system 500, as depicted in FIGS. 5A-5E. In some embodiments, the first anode weld tab 525a and the cathode weld tab 545 can be on the same side of the electrochemical cell system 500, as depicted in FIGS. 5A-5E. FIG. 5B is an auxiliary view of the electrochemical cell system 500 with surface A oriented through the second anode weld tab 525b, while FIG. 5C is a cross-sectional view along surface A. FIG. 5D is an auxiliary view of the electrochemical cell system 500 with surface B oriented through the first anode weld tab 525a and the cathode weld tab 545, while FIG. 5E is a cross-sectional view along surface B. As shown, surface B is oriented through both the first anode weld tab 525a and the cathode weld tab 545. In some embodiments, the cathode weld tab 545 can be positioned such that surface A in FIG. 5B is oriented through the cathode weld tab 545 and the second anode weld tab 525b. In some embodiments, the cathode weld tab 545 can be positioned closer to the middle of the cathode current collector 540, such that neither surface A nor surface B are oriented through the cathode weld tab 545.

In some embodiments, the first anode 510a, second anode 510b, first anode current collector 520a, second anode current collector 520b, first cathode 530a, second cathode 530b, cathode current collector 540, first separator 550a, and the second separator 550b, can have the same or substantially similar properties to the first anode 110a, second anode 110b, first anode current collector 120a, second anode current collector 120b, first cathode 130a, second cathode 130b, cathode current collector 140a, first separator 150a, and the second separator 150b as described above with reference to FIG. 1. As shown, the second anode 510b has a thickness greater than a thickness of the first anode 510a and the second cathode 530b has a thickness greater than a thickness of the first cathode 530a. In some embodiments, the thickness of the second anode 510b can be the same or substantially similar to the thickness of the first anode 510a. In some embodiments, the thickness of the second cathode 530b can be the same or substantially similar to the thickness of the first cathode 530a. As shown, the edges of the cathode weld tab 540 extend beyond the edges of the first cathode 530a and the second cathode 530b. In some embodiments, the edges of the cathode weld tab 540 can be flush with the edges of the first cathode 530a and the second cathode 530b.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

Comparative Example 1

A comparative electrochemical cell Example 1 (also referred to as "Comp Ex 1") was prepared using a semi-solid LFP cathode and a semi-solid anode was formed from mesophase graphite powder (MGP) and C45 Ketjen carbon black. The semi-solid cathode was prepared by ball milling LFP for 48 hours and mixing with ECP600JD carbon and a non-aqueous electrolyte with 0.5 wt % Lithium bis(oxalato) borate (LiBOB). The semi-solid cathode was mixed at a mixing ratio of 48.95 vol % LFP, 1.05 vol % EPC600JD, and 50 vol % electrolyte. The semi-solid anode was prepared by milling MGP and C45 at a weight ratio of 50/2 MGP/C45 for 1 hour. The resulting mixed powder was then mixed with a non-aqueous electrolyte with 0.5 wt % LiBOB at a mixing ratio of 62 vol % powder to 38 vol % electrolyte. The semi-solid anode and the semi-solid cathode were both densified by being placed under a pressure of 6,000 psi, five times. The semi-solid anode and the semi-solid cathode were placed on either side of a separator to form an electrochemical cell. The electrochemical cell had a cathode thickness 1.32 times the thickness of the anode, and the total thickness of the electrochemical cell was 120 μm. The electrochemical cell was then placed in a pouch. The electrochemical cell was charged using a constant current-constant voltage with a constant current rate at C/20. The electrochemical cell was discharged at C/10. The electrochemical cell was initially charged and discharged 3 times.

Comparative Example 2

A comparative electrochemical cell Example 2 (also referred to as "Comp Ex 2") was prepared using a semi-solid LFP cathode and a semi-solid anode was formed from mesophase graphite powder (MGP) and C45 Ketjen carbon black. The semi-solid cathode was prepared by ball milling LFP for 48 hours and mixing with ECP600JD carbon and a non-aqueous electrolyte with 0.5 wt % Lithium bis(oxalato) borate (LiBOB). The semi-solid cathode was mixed at a mixing ratio of 48.95 vol % LFP, 1.05 vol % EPC600JD, and 50 vol % electrolyte. The semi-solid anode was prepared by milling MGP and C45 at a weight ratio of 50/2 MGP/C45 for 1 hour. The resulting mixed powder was then mixed with a non-aqueous electrolyte with 0.5 wt % LiBOB at a mixing ratio of 62 vol % powder to 38 vol % electrolyte. The semi-solid anode and the semi-solid cathode were both densified by being placed under a pressure of 6,000 psi, five times. The semi-solid anode and the semi-solid cathode were placed on ether side of a separator to form an electrochemical cell. The electrochemical cell had a cathode thickness 1.32 times the thickness of the anode, and the total thickness of the electrochemical cell was 360 μm. The electrochemical cell was then placed in a pouch. The electrochemical cell was charged using a constant current-constant voltage with a constant current rate at C/20. The electrochemical cell was discharged at C/10. The electrochemical cell was initially charged and discharged 3 times.

Example 1

A bi-cell Example 1 (also referred to as "Ex 1") was prepared by stacking the Comp Ex 1 electrochemical cell on top of the Comp Ex 2 Electrochemical cell inside of a single pouch, connecting in series.

Example 2

A bi-cell Example 2 (also referred to as "Ex 2") was prepared by placing the Comp Ex 1 electrochemical cell into a first pouch and placing the Comp Ex 2 electrochemical cell into a second pouch and connecting the two electrochemical cells in parallel.

FIGS. 6A-6J show Ragone plots of Ex 1, Ex 2, Comp Ex 1, and Comp Ex 2 at various states of charge (SOC). FIG. 6A, FIG. 6B, FIG. 6C, FIG. 6D, FIG. 6E, FIG. 6F, FIG. 6G, FIG. 6H, FIG. 6I, and FIG. 6J show Ragone plots at 100% SOC, 90% SOC, 80% SOC, 70% SOC, 60% SOC, 50% SOC, 40% SOC, 30% SOC, 20% SOC, and 10% SOC, respectively. As can be seen from these plots, the bi-cells have power densities similar to the thinner single cells, and energy density similar to the thicker cells. In other words, the divided energy systems can lead to combinations of power density and energy density not seen in single electrochemical cells.

The invention claimed is:

1. An electrochemical cell system, comprising:
   a first anode current collector and a second anode current collector;
   a first anode and a second anode, the first anode disposed on the first anode current collector and the second anode disposed on the second anode current collector;
   a cathode current collector;
   a first semi-solid cathode and a second semi-solid cathode, at least one of the first semi-solid cathode and the second semi-solid cathode disposed on the cathode current collector; and
   a first separator and a second separator, the first separator disposed between the first anode and the first semi-solid cathode, the second separator disposed between the second anode and the second semi-solid cathode,
   wherein the first anode has a thickness greater than a thickness of the second anode by a factor of at least about 1.5, and/or
   wherein the first semi-solid cathode has a thickness greater than a thickness of the second semi-solid cathode by a factor of at least about 1.5.

2. The electrochemical cell system of claim 1, wherein the first semi-solid cathode and the second semi-solid cathode are disposed on the cathode current collector.

3. The electrochemical cell system of claim 2, wherein the first anode current collector is disposed onto a first portion of a pouch, and the second anode current collector is disposed onto a second portion of the pouch.

4. The electrochemical cell system of claim 1, wherein the cathode current collector is a first cathode current collector, the electrochemical cell system further comprising a second cathode current collector, wherein the first semi-solid cathode is disposed on the first cathode current collector and the second semi-solid cathode is disposed on the second cathode current collector.

5. The electrochemical cell system of claim 4, wherein:
   the first anode current collector is disposed onto a first portion of a first pouch;
   the first cathode current collector is disposed onto a second portion of the first pouch;
   the second anode current collector is disposed onto a first portion of a second pouch; and
   the second cathode current collector is disposed onto a second portion of the second pouch.

6. The electrochemical cell system of claim 1, wherein at least one of the first semi-solid cathode or the second semi-solid cathode includes lithium cobalt oxide (LCO), lithium nickel manganese cobalt oxide (NMC), and/or lithium iron phosphate (LFP).

7. The electrochemical cell system of claim 1, wherein at least one of the first anode or the second anode includes graphite, lithium metal (Li), sodium metal (Na), silicon oxide (SiO), graphite, silicon, carbon, lithium-intercalated carbon, lithium nitrides, a lithium alloy, and/or a lithium alloy forming compound.

8. The electrochemical cell system of claim 7, wherein the lithium alloy forming compound includes silicon, bismuth, boron, gallium, indium, zinc, tin, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon carbide, and/or a silicon-graphite composite.

9. The electrochemical cell system of claim 1, wherein the first semi-solid cathode has the same chemical composition as that of the second semi-solid cathode.

10. The electrochemical cell system of claim 1, wherein the first semi-solid cathode has a chemical composition different from the second semi-solid cathode.

11. An electrochemical cell system, comprising:
a first current collector;
a first electrode material disposed on a first side of the first current collector;
a second electrode material disposed on a second side of the first current collector, the second side of the first current collector opposite the first side;
a third electrode material disposed on a second current collector;
a fourth electrode material disposed on a third current collector;
a first separator disposed between the first electrode material and the third electrode material to form a first electrochemical cell; and
a second separator disposed between the second electrode material and the fourth electrode material to form a second electrochemical cell, the second electrochemical cell having a thickness greater than a thickness of the first electrochemical cell by a factor of at least about 2.

12. The electrochemical cell system of claim 11, wherein the second electrochemical cell has a thickness greater than a thickness of the first electrochemical cell by a factor of at least about 3.

13. The electrochemical cell system of claim 11, wherein the second current collector is disposed onto a first portion of a pouch, and the third current collector is disposed onto a second portion of the pouch.

14. The electrochemical cell system of claim 11, wherein at least one of the first electrode material, the second electrode material, the third electrode material, or the fourth electrode material includes a semi-solid electrode material.

15. The electrochemical cell system of claim 11, wherein the first electrochemical cell has a different chemical composition from that of the second electrochemical cell.

16. The electrochemical cell system of claim 11, wherein the first electrochemical cell has an internal resistance greater than an internal resistance of the second electrochemical cell, such that the electrochemical cell system has self-heating properties.

* * * * *